(12) United States Patent
Chang et al.

(10) Patent No.: US 10,296,838 B2
(45) Date of Patent: May 21, 2019

(54) APPARATUS AND METHOD FOR CHANGING ALARM INFORMATION IN ACCORDANCE WITH WEATHER

(71) Applicant: SK techx Co., Ltd., Seoul (KR)

(72) Inventors: Seok-Woong Chang, Seoul (KR);
Won-Seok Park, Seoul (KR);
Kwang-Min Myung, Goyang-si (KR);
Jae-Sic Jeon, Seoul (KR)

(73) Assignee: SK TECHX CO., LTD., Seoul (KR)

( * ) Notice: Subject to any disclaimer, the term of this patent is extended or adjusted under 35 U.S.C. 154(b) by 684 days.

(21) Appl. No.: 14/899,476

(22) PCT Filed: Dec. 1, 2014

(86) PCT No.: PCT/KR2014/011616
§ 371 (c)(1),
(2) Date: Dec. 17, 2015

(87) PCT Pub. No.: WO2015/105277
PCT Pub. Date: Jul. 16, 2015

(65) Prior Publication Data
US 2016/0148100 A1    May 26, 2016

(30) Foreign Application Priority Data

Jan. 7, 2014 (KR) .................. 10-2014-0001740
Jan. 16, 2014 (KR) .................. 10-2014-0005768
Jan. 16, 2014 (KR) .................. 10-2014-0005769

(51) Int. Cl.
*G06N 5/04* (2006.01)
*H04W 4/02* (2018.01)
(Continued)

(52) U.S. Cl.
CPC ............. *G06N 5/04* (2013.01); *G06N 20/00* (2019.01); *G06Q 50/26* (2013.01); *H04W 4/02* (2013.01)

(58) Field of Classification Search
USPC ............................................. 706/12
See application file for complete search history.

(56) References Cited

U.S. PATENT DOCUMENTS 5,500,835 A    3/1996  Born
6,400,941 B1*  6/2002  Nara ............... H04M 1/274566
                                                455/422.1
(Continued)

FOREIGN PATENT DOCUMENTS

JP      05-249252 A    9/1993
JP      07049986 A     2/1995
(Continued)

OTHER PUBLICATIONS

International Journal of Engineering and Computer Science ISSN:2319-7242 vol. 4 Issue 4 Apr. 2015, p. No. 11352-11355 Real Time Location Tracking Application based on Location Alarm Adnaan Ghadiyali, Ankur Tiku, Sumeet Bandevar, Ruturaj Tengale.*

(Continued)

*Primary Examiner* — Michael B Holmes
(74) *Attorney, Agent, or Firm* — Brinks Gilson & Lione

(57) ABSTRACT

The present invention relates to an apparatus and method for changing alarm information based on weather, and more particularly to an apparatus and method for changing alarm information based on weather, which can collect locations, time and weather information for a path, routinely used by a user, and a destination and actively adjust alarm time based on a weather condition, which can measure the gap between a weather forecast and real-time observation data, determine whether a gap notification condition has been satisfied and provide notification to a user, and which can collect location (Continued)

information and weather information via a report message, determine the urgency level of a disaster situation and generate a disaster information list that enables the disaster situation to be effectively determined.

9 Claims, 20 Drawing Sheets

(51) Int. Cl.
*G06N 20/00* (2019.01)
*G06Q 50/26* (2012.01)

(56) References Cited

U.S. PATENT DOCUMENTS

| | | | | |
|---|---|---|---|---|
| 6,505,123 | B1* | 1/2003 | Root | G01W 1/00 |
| | | | | 702/3 |
| 6,590,629 | B1* | 7/2003 | Hirobe | G02F 1/13452 |
| | | | | 349/149 |
| 6,741,188 | B1* | 5/2004 | Miller | G06Q 30/0255 |
| | | | | 340/539.13 |
| 7,084,775 | B1* | 8/2006 | Smith | G01W 1/00 |
| | | | | 340/601 |
| 7,525,450 | B2* | 4/2009 | Miller | G06Q 30/0255 |
| | | | | 340/539.13 |
| 7,565,153 | B2* | 7/2009 | Alcock | H04M 3/42229 |
| | | | | 455/456.1 |
| 8,190,359 | B2* | 5/2012 | Bourne | G01C 21/20 |
| | | | | 701/410 |
| 8,265,553 | B2* | 9/2012 | Cheon | H04M 1/72527 |
| | | | | 361/679.4 |
| 8,316,085 | B2* | 11/2012 | Jeon | H04L 29/12066 |
| | | | | 709/203 |
| 8,527,635 | B2* | 9/2013 | Jeon | H04L 29/12066 |
| | | | | 709/203 |
| 9,948,639 | B2* | 4/2018 | Jeon | H04L 63/0853 |
| 2002/0091692 | A1* | 7/2002 | Yoshida | G06Q 30/02 |
| 2003/0001727 | A1 | 1/2003 | Steinmark | |
| 2004/0145459 | A1 | 7/2004 | Himmelstein | |
| 2013/0208712 | A1 | 8/2013 | Lee | |
| 2016/0148100 | A1* | 5/2016 | Chang | G06Q 50/26 |
| | | | | 706/12 |

FOREIGN PATENT DOCUMENTS

| | | |
|---|---|---|
| JP | 2001349960 A | 12/2001 |
| JP | 2006242747 A | 9/2006 |
| JP | 2010-071952 A | 4/2010 |
| KR | 1019950033738 A | 12/1995 |
| KR | 1020020001070 A | 1/2002 |
| KR | 10-0563904 B1 | 3/2006 |
| KR | 1020060039502 A | 5/2006 |
| KR | 1020060065046 A | 6/2006 |
| KR | 10-2006-0093813 A | 8/2006 |
| KR | 1020070000259 A | 1/2007 |
| KR | 1020080007769 A | 1/2008 |
| KR | 1020100009690 A | 1/2010 |
| KR | 1020110135037 A | 12/2011 |
| KR | 10-2013-0010789 A | 1/2013 |
| KR | 1020130043422 A | 4/2013 |
| KR | 1020130091936 A | 8/2013 |

OTHER PUBLICATIONS

G.V.M.vasuki et al, / (IJCSIT) International Journal of Computer Science and Information Technologies, vol. 5 (1), 2014, 967-969 Location Based Alarm System Depending on Logitude and Lattitude G.V.M.vasuki, D.mounika, CH.Dayeswari, M.Renuka, Bhumik. D.Varu.*

IEEE—Toward context-aware location based services, Tongyu Zhu; Chen Wang; Guannan Jia; Jian Huang, 2010 International Conference on Electronics and Information Engineering Aug. 1-3, 2010 pp. 409-413.*

International Search Report for PCT/KR2014/011616 dated Feb. 11, 2015.

* cited by examiner

| PRIORITY | LOCATION | TYPE OF DISASTER | REPORT TIME | ... |
|---|---|---|---|---|
| 1 | SEOUL-GANGNAM | HEAVY SNOW | 8:00 A.M. | |
| 2 | | | | |
| 3 | | | | |
| ⋮ | | | | |

FIG. 19

APPARATUS AND METHOD FOR CHANGING ALARM INFORMATION IN ACCORDANCE WITH WEATHER

CROSS REFERENCE TO RELATED APPLICATION

The present invention claims the benefits of Korean Patent Application No. 10-2014-0001740 filed on Jan. 7, 2014, Korean Patent Application No. 10-2014-0005769 filed on Jan. 16, 2014, and Korean Patent Application No. 10-2014-0005768 filed on Jan. 16, 2014, in the Korean Patent and Trademark Office. Further, this application is the National Phase application of International No. PCT/KR2014/011616 filed on Dec. 1, 2014 which are hereby incorporated by reference in their entirety into this application.

TECHNICAL FIELD

The present invention relates to an apparatus and method for changing alarm information based on weather, and more particularly to an apparatus and method for changing alarm information based on weather, which can collect locations, time and weather information for a path, routinely used by a user, and a destination and actively adjust alarm time based on a weather condition, which can measure the gap between a weather forecast and real-time observation data, determine whether a gap notification condition has been satisfied and provide notification to a user, and which can collect location information and weather information via a report message, determine the urgency level of a disaster situation and generate a disaster information list that enables the disaster situation to be effectively determined.

BACKGROUND ART

In alarm devices and alarm clocks that are generally being used, a user sets desired alarm time and uses it, and the set alarm time is not changed until the user directly changes the alarm time. However, due to the occurrence of a situation related to a variable that has not been calculated by a user, preparation time or movement time may be delayed, in which case it is preferred that an alarm be issued earlier than preset alarm time, but the alarm devices cannot perform active adjustment yet. In modern society where time is extremely valuable, a tardiness of a few minutes or a few tens of minutes may cause damage in the range from a slight loss to unimaginably heavy damage. Accordingly, alarm devices require technology that can actively determine an unanticipated weather situation and reset alarm time or that can provide notification of a situation to a user and thus enables a user to prepare for the situation by reducing preparation time.

Accordingly, there is an urgent need for technology for changing alarm information, which can check a location and time at regular time intervals during a period after the issuance of an alarm until reaching a destination, can determine that a destination has been reached if a user has stayed for a data collection period longer than the threshold value of an arrival counter at a location near the destination, and can calculate movement time and a change in alarm time based on the current weather of a place of departure, the current weather of a destination, and the predicted weather value of the destination.

Related preceding technologies include Korean Patent Application Publication No. 10-2008-0007769 published on Jan. 23, 2008 (entitled "Apparatus for Variably Controlling Wakeup Time to associate Weather with Traffic Information in Mobile Phone"), Japanese Unexamined Patent Application Publication No. 2006-242747 published on Sep. 14, 2006 (entitled "Apparatus for Predicting and Correcting Temperature"), and Korean Patent Application Publication No. 10-2010-0009690 published on Jan. 29, 2010 (entitled "Fire Detection Apparatus equipped with Logic Program in which Multiple Fire Signals have been combined and Fire Detection Reading Method using the Same").

DISCLOSURE

Technical Problem

An object of the present invention is to derive the correlation between movement time and a path and weather, and issue an alarm whose time has been adjusted when an increase in movement time attributable to a change in weather along the routine path of a user, thereby enabling the user to prepare for the increase in movement time.

Furthermore, an object of the present invention is to measure the gap between a weather forecast and real-time observation data, and provide information about the gap to a user.

Furthermore, an object of the present invention is to determine whether a gap notification condition has been satisfied based on the gap between a weather forecast and real-time observation data, and provide information about the satisfaction of the gap alarm condition to a user if it is determined that the gap notification condition has been satisfied.

Furthermore, an object of the present invention is to determine whether a gap notification condition has been satisfied based on the combination of conditions based on two or more variables included in the gap between a weather forecast and real-time observation data, predict a change in weather, and provide guidance to a user.

Furthermore, an object of the present invention is to determine whether a gap alarm condition has been satisfied by taking into account the correlation between a gap and the tendency of actual weather, which is analyzed using past data, thereby increasing the accuracy of the prediction of a change in weather.

Furthermore, an object of the present invention is to allow weather information to be tagged when a disaster situation is reported by a terminal device user, thereby enabling the actual urgency level of a disaster situation to be easily determined.

Furthermore, an object of the present invention is to provide a disaster information list and a disaster information map in which priorities have been assigned to disaster situations reported via report messages based on the urgency of the situations and thus all the disaster situations can be efficiently identified.

Technical Solution

In order to accomplish one or more of the above objects, an embodiment of the present invention provides an apparatus for changing alarm information based on weather, including: a path information generation unit configured to generate path information about a path routinely used by a user; a data collection unit configured to check the location of the user and the time during a period from alarm time set by the user until reaching the destination of the path at intervals of a preset data collection period; a weather information acquisition unit configured to collect weather information corresponding to the location of the user and the destination; a weather database configured to calculate average movement time for each weather condition by storing and analyzing the location of the user, the time and the weather information; and an alarm adjustment unit configured to calculate a change in the alarm time based on the weather information and the average movement time for each weather condition and then adjust the alarm time by applying the change in the alarm time.

In this case, the data collection unit may determine that the destination has been reached if the user has stayed for a period of time, corresponding to a number of data collection periods larger than the threshold value of an arrival counter, within a preset distance from the destination.

In this case, the weather information acquisition unit may acquire the weather information using weather forecasts corresponding to the location of the user and the destination, and may collect the weather information at a weather check time corresponding to the alarm time and at an estimated time at which the destination will be reached.

In this case, the weather information acquisition unit calculates the estimated time at which the destination will be reached based on the location of the user and the time.

In this case, the weather database may calculate the average movement time for each weather condition based on precipitation and rainfall; and may update the average movement time for each weather condition whenever the location of the user, the time and the weather information are stored.

In this case, the alarm adjustment unit may further include a message output unit configured to display the cause of the change in the alarm time to the user in a message form; and the apparatus for changing alarm information may further include a location measurement unit configured to measure the location of the user.

Furthermore, an embodiment of the present invention provides a method of changing alarm information based on weather, including: generating path information about a path routinely used by a user; checking the location of the user and the time during a period from alarm time set by the user until reaching a destination of the path at intervals of a preset data collection period; collecting weather information corresponding to the location of the user and the destination; and calculating a change in the alarm time based on average movement time for each weather condition, calculated by storing and analyzing the location of the user, the time and the weather information, and the weather information, and then adjusting the alarm time by applying the change in the alarm time.

In this case, the checking may include determining that the destination has been reached if the user has stayed for a period of time, corresponding to a number of data collection periods larger than the threshold value of an arrival counter, within a preset distance from the destination.

In this case, the collecting may include: acquiring the weather information using weather forecasts corresponding to the location of the user and the destination; and collecting the weather information at a weather check time corresponding to the alarm time and at an estimated time at which the destination will be reached.

Furthermore, an embodiment of the present invention provides a weather information service device, including: an input unit configured to receive a weather forecast in each first period and collect real-time observation data on a weather state in each second period; a control unit configured to measure a gap between the real-time observation data and the weather forecast and determine whether a gap alarm condition has been satisfied based on the gap; and a communication unit configured to generate and transmit an alarm corresponding to the gap alarm condition if the gap alarm condition has been satisfied.

In this case, the control unit may measure the gap between the real-time observation data and the weather forecast for any one or more of temperature, atmospheric pressure, humidity, a direction of wind, speed of wind, snowfall, an amount of fog and precipitation; and may determine whether the satisfaction of the gap alarm condition has been achieved by taking into account any one or more of the type of gap between the real-time observation data and the weather forecast, the size of the gap, the duration for which the gap has been maintained outside a preset reference range, and the tendency of the gap.

In this case, the control unit may measure the gap between the real-time observation data and the weather forecast for any two or more of temperature, atmospheric pressure, humidity, the direction of wind, the speed of wind, snowfall, the amount of fog and precipitation; and may determine whether the satisfaction of the gap alarm condition has been achieved based on a combination of conditions based on two or more variables included in the gap.

In this case, the control unit may determine whether the gap alarm condition has been satisfied by taking into account the correlation between the gap and the tendency of actual weather, which has been analyzed using past data.

In this case, the control unit may measure the gap during a period excluding a preset interval before and after the time at which the weather forecast is received.

Furthermore, an embodiment of the present invention provides a weather information service method, including: receiving a weather forecast in each first period; collecting real-time observation data on a weather state in each second period; measuring a gap between the real-time observation data and the weather forecast; determining whether a gap alarm condition has been satisfied based on the gap; and generating and transmitting an alarm corresponding to the gap alarm condition if the gap alarm condition has been satisfied.

Furthermore, an embodiment of the present invention provides a device for generating disaster information, including: a message reception unit configured to receive a report message, including location information and weather information, from a terminal device in order to determine a disaster situation; a weight calculation unit configured to calculate a weight by analyzing the weather information in order to determine the urgency information of the disaster situation determined via the report message; and a list generation unit configured to generate a disaster information list by assigning a priority to the disaster situation through the application of the weight to the disaster situation and then applying the priority to an area corresponding to the location information.

In this case, the list generation unit may assign a higher priority to the disaster situation in proportion to the value of the weight; and may locate the disaster situation in a higher position of the disaster information list in proportion to the priority.

Furthermore, an embodiment of the present invention provides a terminal device, including: a location information acquisition unit configured to acquire the location information of an area tagged by a user; a weather information collection unit configured to collect weather information corresponding to the location information; and a message transmission unit configured to transmit a report message, including the disaster information, the location information and the weather information, to a disaster information generation device so that the disaster information generation device generates a disaster information list by analyzing the disaster information including the location information and the weather information.

Furthermore, an embodiment of the present invention provides a method of generating disaster information in a device for generating disaster information, including: receiving a report message, including location information and weather information, from a terminal device in order to determine a disaster situation; calculating a weight by analyzing the weather information in order to determine the urgency information of the disaster situation determined via the report message; and generating a disaster information list by assigning a priority to the disaster situation through the application of the weight to the disaster situation and then applying the priority to an area corresponding to the location information.

Furthermore, an embodiment of the present invention provides A method of generating disaster information in a terminal device, including: acquiring the location information of an area tagged by a user; collecting weather information corresponding to the location information; and transmitting a report message, including the disaster information, the location information and the weather information, to a disaster information generation device so that the disaster information generation device generates a disaster information list by analyzing the disaster information including the location information and the weather information.

Advantageous Effects

According to the present invention, when an alarm is routinely used, alarm time is automatically adjusted by taking into account the correlation between weather and movement time to a destination, thereby enabling an alarm user from preventing damages, such as tardiness and an increase in movement time, which may occur due to a change in weather.

Furthermore, the present invention can measure the gap between a weather forecast and real-time observation data, and can provide information about the gap to a user.

Furthermore, the present invention can determine whether a gap notification condition has been satisfied based on the gap between a weather forecast and real-time observation data, and can provide information about the satisfaction of the gap alarm condition to a user if it is determined that the gap notification condition has been satisfied.

Furthermore, the present invention can determine whether a gap notification condition has been satisfied based on the combination of conditions based on two or more variables included in the gap between a weather forecast and real-time observation data, can predict a change in weather, and can provide guidance to a user.

Furthermore, the present invention can determine whether a gap alarm condition has been satisfied by taking into account the correlation between a gap and the tendency of actual weather, which is analyzed using past data, thereby increasing the accuracy of the prediction of a change in weather.

Furthermore, the present invention can receive reports on disaster situations for which weather information has been tagged from users who use terminal devices in real time, thereby enabling a person in charge of disaster prevention to rapidly determining the actual damage situations and urgency levels of disaster situations.

Furthermore, the present invention can generate a list and an information map to determine disaster situations reported via disaster report messages based on the urgency of the situations, thereby enabling a disaster situation requiring preferential disaster prevention to be efficiently determined.

DESCRIPTION OF DRAWINGS

FIG. 19 is a diagram showing a disaster information list according to an embodiment of the present invention;

MODE FOR INVENTION

Figure 1:
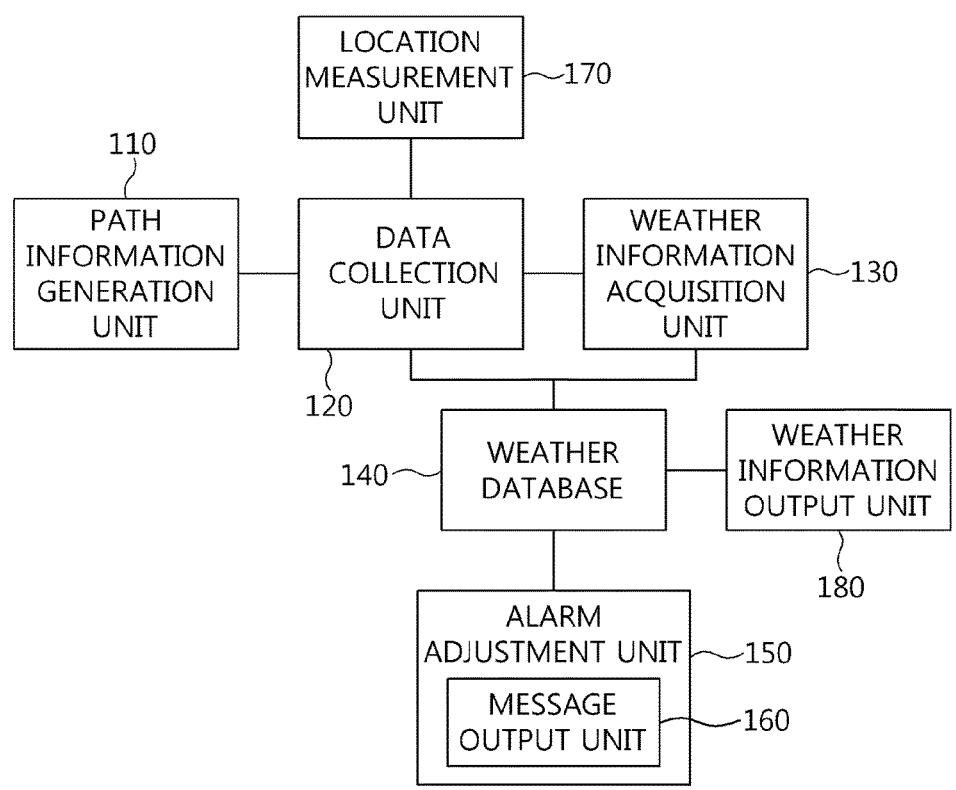
FIG. 1 is a block diagram showing an apparatus for changing alarm information according to an embodiment of the present invention.

The present invention will be described in detail below with reference to the accompanying drawings. In this case, redundant descriptions and detailed descriptions of well-known functions and configurations that may make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Preferred embodiments according to the present invention are described in detail with reference to the accompanying drawings.

FIG. 1 is a block diagram showing an apparatus for changing alarm information according to an embodiment of the present invention.

Referring to FIG. 1, the apparatus for changing alarm information according to the embodiment of the present invention includes a path information generation unit 110, a data collection unit 120, a weather information acquisition unit 130, a weather database 140, an alarm adjustment unit 150, a message output unit 160, a location measurement unit 170, and a weather information output unit 180.

The path information generation unit 110 generates path information about a path that is routinely used by a user.

The data collection unit 120 checks the location of the user and time at intervals of a preset data collection period during a period from alarm time set by the user until reaching the destination of the path. For example, if the user sets the alarm time at which he or she will wake up and the destination of a path is a company, the data collection period may be set between 10 minutes and 15 minutes, and the location and the time can be checked while the user is going to the company.

In this case, the data collection unit 120 may determine that the destination has been reached if the user has stayed for a period of time, corresponding to a number of data collection periods larger than the threshold value of an arrival counter, within a preset distance from the destination. For example, an arrival counter may be increased in each collection period from the time at which the user arrives within a radius of 50 meters from a destination, and it is determined that the destination has been reached if the arrival counter exceeds the threshold value.

The weather information acquisition unit 130 collects weather information corresponding to the location of the user and the destination.

In this case, the weather information acquisition unit 130 may acquire the weather information using weather forecasts corresponding to the location of the user and the destination.

In this case, the weather information acquisition unit 130 may collect the weather information at a weather check time which corresponds to the alarm time and the estimated time at which the destination will be reached.

In this case, the weather information acquisition unit 130 may calculate the estimated time at which the destination will be reached based on the locations of the user and the times. For example, the location of the user and the time may be acquired via the data collection unit 120 several times and stored in the weather database 140, and the movement time it takes to reach the destination may be calculated for each weather condition by analyzing information about the stored locations of the user and times. The estimated time at which the user will reach the destination may be acquired via the movement time acquired as described above.

The weather database 140 calculates average movement time for each weather condition by storing and analyzing the locations of the user, the times and the weather information. For example, the average movement time it takes to reach the destination for a sunny day may be calculated via information about the location of the user and time stored on a sunny day, and the movement time it takes to normally reach the destination on a snowy or rainy day may be calculated via information about the location of the user and time stored on a rainy or snowy day.

In this case, the weather database 140 may calculate average movement time for each weather condition based on precipitation and rainfall. For example, ranges based on precipitation may be set as 1 to 20 mm, 20 to 40 mm, 40 to 60 mm, and 60 mm or more, and average movement time may be calculated based on the precipitation of a weather forecast corresponding to a relevant range.

In this case, the weather database 140 may update the average movement time for each weather condition whenever the location of the user, the time and the weather information are stored. For example, if the average movement time for a rainy day calculated on January 1, which is a rainy day, was one hour, movement time was one hour and 20 minutes on January 2, which is a rainy day, and rain is forecast to fall on January 3, the average movement time for each weather condition may be calculated by also applying the movement time on January 2 when the average movement time for each weather condition is calculated.

The alarm adjustment unit 150 calculates a change in the alarm time based on the weather information and the average movement time for each weather condition, and adjusts the alarm time by applying the change in the alarm time. For example, if average movement time on a sunny day is one hour and average movement time on a rainy day is one hour and 20 minutes based on the average movement time for each weather condition, the user may be enabled to prepare for the condition by adjusting the alarm time 20 minutes ahead on a rainy day.

In this case, the alarm adjustment unit 150 may further include a message output unit 160 configured to display the cause of the change in the alarm time to the user in the form of a message. For example, when the alarm time has been changed due to rain or snow, a message indicating that the alarm time has been adjusted by the change time due to rain or snow may be output while an alarm is being sounded at the changed alarm time.

The location measurement unit 170 measures the location of the user. For example, when the data collection unit 120 acquires the location of the user, the data collection unit 120 may provide the location of the user information, measured by the location measurement unit 170, to the data collection unit 120.

If the number of times the location of the user, the time and the weather information have been stored in the weather database 140 is smaller than the preset number of times regarding storage, the weather information output unit 180 outputs weather information corresponding to the location of the user to the user at the alarm time. For example, if the preset number of times regarding storage is 10 and the number of times the location of the user, the time and the weather information have been stored in the weather database 140 is smaller than 10, the location of the user may be measured at the alarm time set by the user and weather information for each time or for each area may be output.

Figure 2:
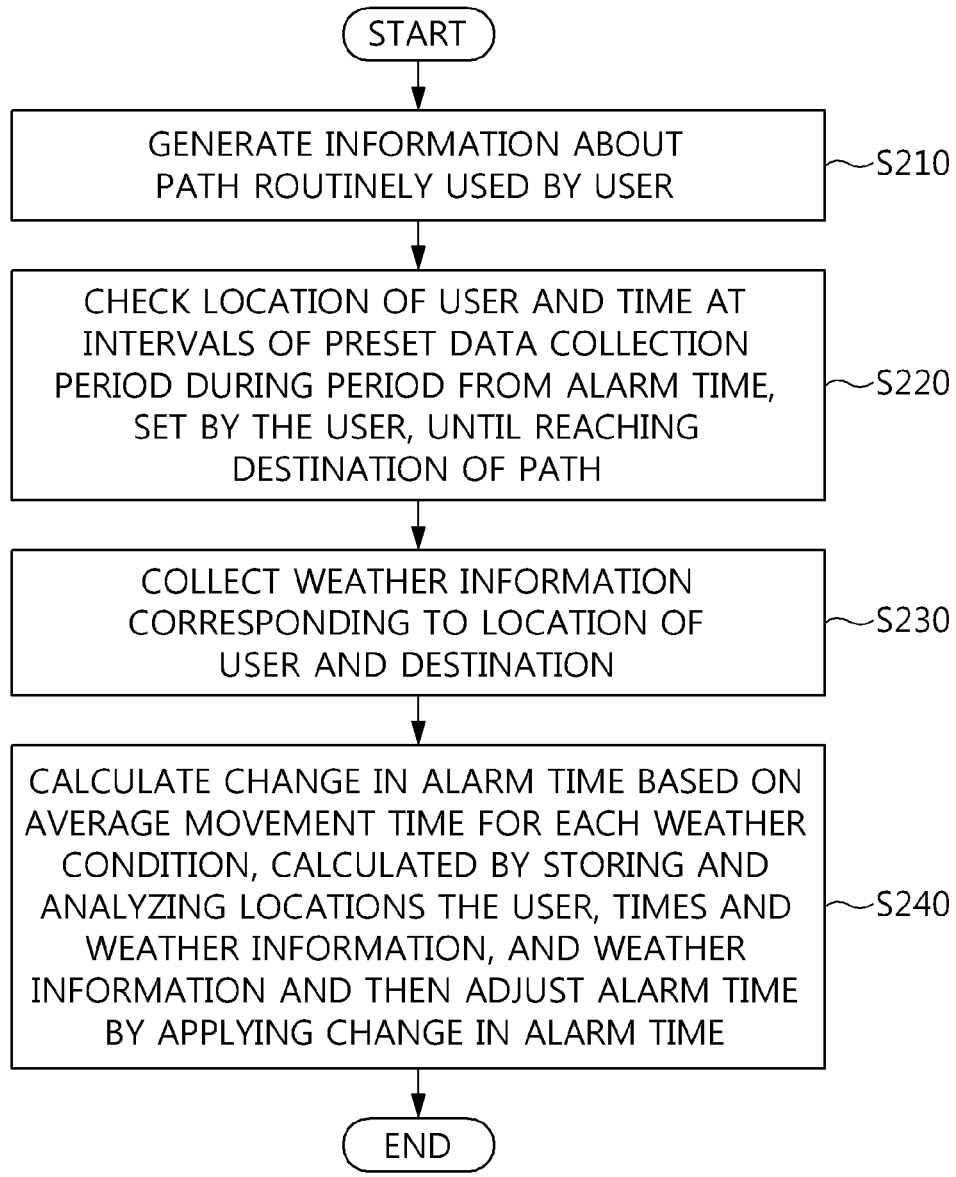
FIG. 2 is an operation flowchart showing a method of changing alarm information according to an embodiment of the present invention.

FIG. 2 is an operation flowchart showing a method of changing alarm information according to an embodiment of the present invention.

Referring to FIG. 2, the method of changing alarm information according to the embodiment of the present invention generates path information about a path that is routinely used by a user at step S210.

Furthermore, the method of changing alarm information according to the embodiment of the present invention checks the location of the user and time at intervals of a preset data collection period during a period from alarm time, set by the user, until reaching the destination of the path at step S220. For example, if the user sets the alarm time at which he or she will wake up and the destination of a path is a company, the data collection period may be set between 10 minutes and 15 minutes, and the location and the time may be checked while the user is going to the company.

In this case, it may be determined that the destination has been reached if the user has stayed for a period of time, corresponding to a number of data collection periods larger than the threshold value of an arrival counter, within a preset distance from the destination. For example, an arrival counter may be increased in each collection period from the time at which the user arrives within a radius of 50 meters from a destination, and it is determined that the destination has been reached if the arrival counter exceeds the threshold value.

The method of changing alarm information according to the embodiment of the present invention collects weather information corresponding to the location of the user and the destination at S230.

In this case, the weather information may be acquired using weather forecasts corresponding to the location of the user and the destination.

In this case, the weather information may be collected at a weather check time which corresponds to the alarm time and the estimated time at which the destination will be reached.

In this case, the estimated time at which the destination will be reached may be calculated based on the locations of the user and the times. For example, the location of the user and the time may be acquired via the data collection unit several times and stored in the weather database, and the movement time it takes to reach the destination may be calculated for each weather condition by analyzing information about the stored locations of the user and times. The estimated time at which the user will reach the destination may be acquired via the movement time acquired as described above.

The method of changing alarm information according to the embodiment of the present invention calculates a change in the alarm time based on average movement time for each weather condition, calculated by storing and analyzing the locations of the user, the times and the weather information, and the weather information and then adjusts the alarm time by applying the change in the alarm time at step S240. For example, the average movement time it takes to reach the destination for a sunny day may be calculated via information about the location of the user and time stored on a sunny day, and the movement time it takes to normally reach the destination on a snowy or rainy day may be calculated via information about the location of the user and time stored on a rainy or snowy day. If average movement time on a sunny day is one hour and average movement time on a rainy day is one hour and 20 minutes based on the average movement time for each weather condition, the user may be enabled to prepare for the condition by adjusting the alarm time 20 minutes ahead on a rainy day.

In this case, the average movement time for each weather condition may be calculated based on precipitation and rainfall. For example, ranges based on precipitation may be set as 1 to 20 mm, 20 to 40 mm, 40 to 60 mm, and 60 mm or more, and the average movement time may be calculated based on the precipitation of a weather forecast corresponding to a relevant range.

In this case, the average movement time for each weather condition may be updated whenever the location of the user, the time and the weather information are stored. For example, if average movement time for a rainy day calculated on January 1, which is a rainy day, was one hour, movement time was one hour and 20 minutes on January 2, which is a rainy day, and rain is forecast to fall on January 3, the average movement time for each weather condition may be calculated by also applying the movement time on January 2 when the average movement time for each weather condition is calculated.

In this case, the cause of the change in the alarm time may be displayed to the user in the form of a message. For example, when the alarm time has been changed due to rain or snow, a message indicating that the alarm time has been adjusted by the change time due to rain or snow may be output while an alarm is being sounded at the changed alarm time.

Although not shown in FIG. 2, the method of changing alarm information may measure the location of the user. For example, when the data collection unit acquires the location of the user, the data collection unit may provide the location of the user information, measured by the location measurement unit, to the data collection unit.

Although not shown in FIG. 2, if the number of times the location of the user, the time and the weather information have been stored in the weather database is smaller than the preset number of times regarding storage, the method of changing alarm information may output weather information corresponding to the location of the user to the user at the alarm time. For example, if the preset number of times regarding storage is 10 and the number of times the location of the user, the time and the weather information have been stored in the weather database is smaller than 10, the location of the user may be measured at the alarm time set by the user and weather information for each time or for each area may be output.

Figure 3:
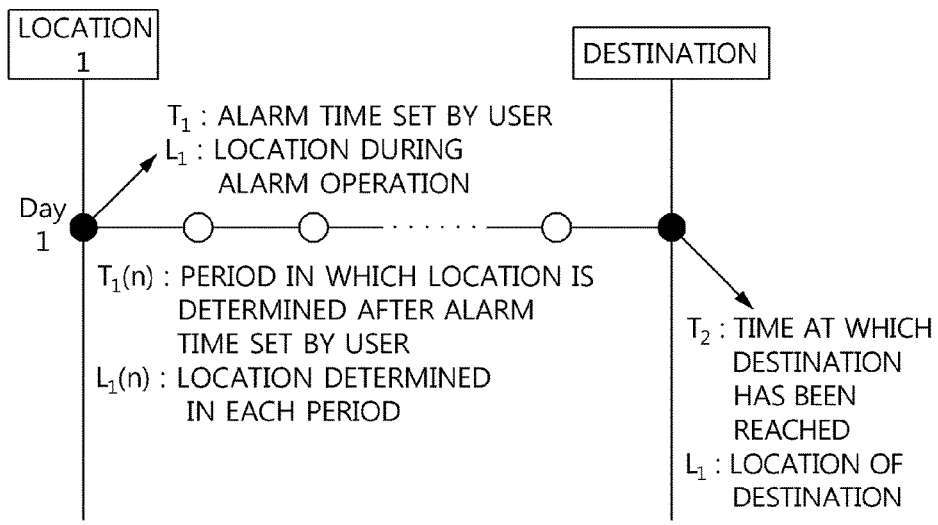
FIG. 3 is a diagram showing an example of a data collection period adapted to change alarm information according to the present invention.

FIG. 3 is a diagram showing an example of a data collection period adapted to change alarm information according to the present invention.

Referring to FIG. 3, it may be seen that data adapted to change alarm information according to the present invention is collected at $T_1$ (alarm time set by a user), at $T_2$ (the time at which a destination has been reached), and at $T_1(n)$ (in a period in which a location is determined after the alarm time set by the user).

A user may set alarm time $T_1$ for a daily repeated pattern, such as the pattern of going to work or school, or the like. This time may be the time it takes to prepare for going to work or school and move to a company or school, i.e., a destination, when there is no particular weather condition, which is freely set by the user.

The apparatus for changing alarm information according to the present invention may operate in accordance with alarm time $T_1$ set by the user, may determine the current location $L_1$ of the user, and may display current weather information at current location $L_1$ and weather information corresponding to estimated arrival time $T_2$ at destination $L_2$ to the user. Thereafter, a user may move to destination $L_2$, and may acquire location $L(n)$ in each location determination period $T(n)$ in a background until a destination is reached.

The above-described data collection period of FIG. 3 may be repeated, and data acquired in this process may be accumulated in the weather database. In this case, the weather database may include not only a conventional relational database but also a database used for alternative file distribution processing. In this case, the weather database may store information, including $W\_Current\_L_1$, i.e., weather information at time $T_1$ and location $L_1$, $W\_Forecast\_L_2$, i.e., weather information at time $T_1$ and location $L_2$, and $W\_Forecast\_L_1(n)$, i.e., weather information corresponding to time/location $T_1(n)/L_1(n)$.

Figure 4:
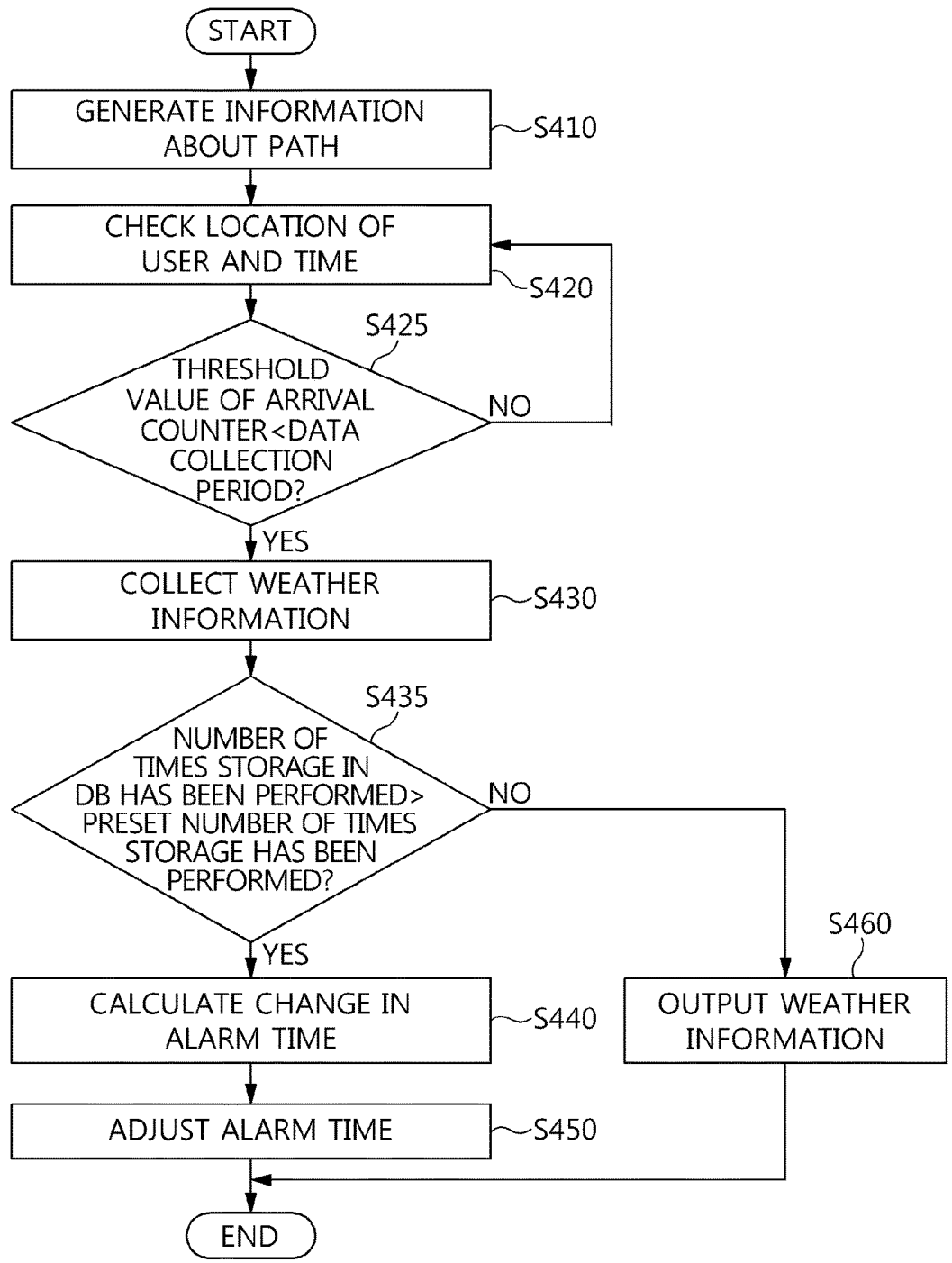
FIG. 4 is an operation flowchart showing a method of changing alarm information according to an embodiment of the present invention in detail.

FIG. 4 is an operation flowchart showing a method of changing alarm information according to an embodiment of the present invention in detail.

Referring to FIG. 4, the method of changing alarm information according to the embodiment of the present invention generates path information at step S410. In this case, the generated path information may be information about a path that is routinely used by the user.

Furthermore, the method of changing alarm information according to the embodiment of the present invention checks the location of the user and time at step S420. In this case, the checking may be performed at intervals of a preset data collection period during a period from alarm time set by the user until reaching the destination of the path. For example, if the user sets the alarm time at which he or she will wake up and the destination of a path is a company, the data collection period may be set between 10 minutes and 15 minutes, and the location and the time may be checked while the user is going to the company.

Furthermore, the method of changing alarm information according to the embodiment of the present invention determines whether the destination has been reached by comparing the threshold value of an arrival counter with the time of data collection periods at step S425. In this case, it may be determined that the destination has been reached if the user has stayed for a period of time, corresponding to a number of data collection periods larger than the threshold value of the arrival counter, within a preset distance from the destination.

If, as a result of the determination at step S425, the threshold value of the arrival counter is larger than the number of data collection periods, it is determined that the destination has not been reached, and then the location of the user and time are checked.

If, as a result of the determination at step S425, the threshold value of the arrival counter is smaller than the number of data collection periods, it is determined that the destination has been reached, and then weather information is collected at step S430. In this case, the weather information may be acquired using weather forecast corresponding to the location of the user and the destination. In this case, the weather information may be collected at a weather check time corresponding to the alarm time and the estimated time at which the destination will be reached, and the estimated time at which the destination will be reached may be calculated based on the locations of the user and the times. For example, the location of the user and the time may be acquired via the data collection unit several times and stored in the weather database, and the movement time it takes to reach the destination may be calculated for each weather condition by analyzing information about the stored locations of the user and times. The estimated time at which the user will reach the destination may be acquired via the movement time acquired as described above.

Furthermore, a method of changing alarm information according to an embodiment of the present invention may determine whether to calculate the change in the alarm time by comparing the number of times the location of the user, the time and the weather information have been stored in the weather database with the preset number of times regarding storage at step S435. For example, if the preset number of times regarding storage is 10 and the number of times the location of the user, the time and the weather information have been stored in the weather database is smaller than 10, it may be possible to measure the location of the user at the alarm time set by the user without changing the alarm time set by the user and to output weather information for each time or for each area.

If, as a result of the determination at step S435, the number of times the storage has been performed in the weather database is smaller than the preset number of times regarding storage, weather information corresponding to the location of the user is output to the user at the alarm time at step S460.

If, as a result of the determination at step S435, the number of times the storage has been performed in the weather database is larger than the preset number of times regarding storage, a change in the alarm time is calculated based on calculated average movement time for each weather condition and the weather information by analyzing the locations of the user, the times and the weather information at step S440. For example, the average movement time it takes to reach the destination for a sunny day may be calculated via information about the location of the user and time stored on a sunny day, and the movement time it takes to normally reach the destination on a snowy or rainy day may be calculated via information about the location of the user and time stored on a rainy or snowy day. If average movement time on a sunny day is one hour and average movement time on a rainy day is one hour and 20 minutes based on the average movement time for each weather condition, the user may be enabled to prepare for the condition by adjusting the alarm time 20 minutes ahead on a rainy day. In this case, the average movement time for each weather condition may be calculated based on precipitation and rainfall. For example, ranges based on precipitation may be set as 1 to 20 mm, 20 to 40 mm, 40 to 60 mm, and 60 mm or more, and the average movement time may be calculated based on the precipitation of a weather forecast corresponding to a relevant range. Furthermore, the average movement time for each weather condition may be updated whenever the location of the user, the time and the weather information are stored. For example, if average movement time for a rainy day calculated on January 1, which is a rainy day, was one hour, movement time was one hour and 20 minutes on January 2, which is a rainy day, and rain is forecast to fall on January 3, the average movement time for each weather condition may be calculated by also applying the movement time on January 2 when the average movement time for each weather condition is calculated.

Furthermore, the method of changing alarm information according to the embodiment of the present invention adjusts the alarm time by applying the change in the alarm time to the alarm time at step S450. In this case, the cause of the change in the alarm time may be displayed to the user in the form of a message. For example, when the alarm time has been changed due to rain or snow, a message indicating that the alarm time has been adjusted by the change time due to rain or snow may be output while an alarm is being sounded at the changed alarm time.

Figure 5:
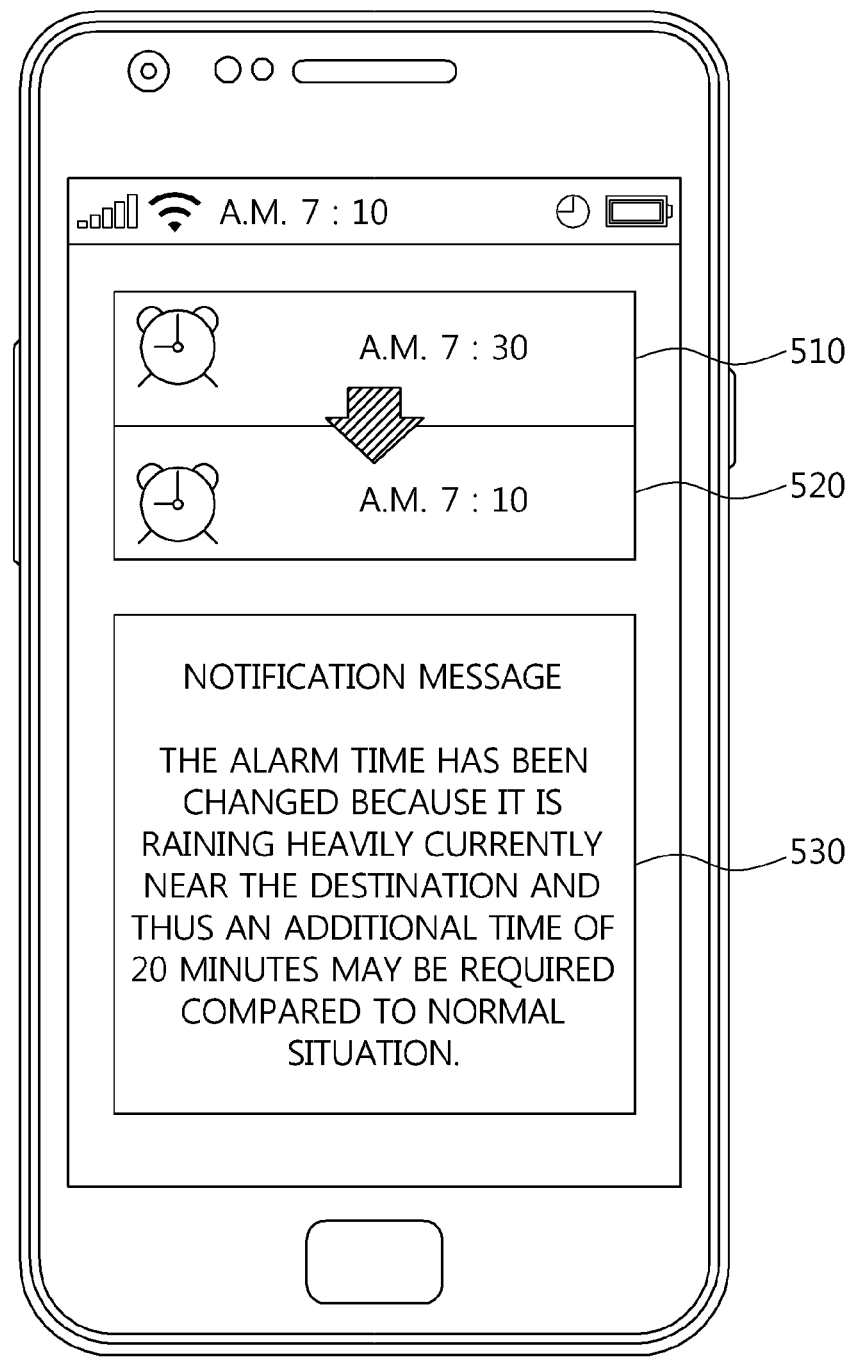
FIG. 5 is a diagram showing an example of a notification message screen displayed on the apparatus for changing alarm information shown in FIG. 1.

FIG. 5 is a diagram showing an example of a notification message screen displayed on the apparatus for changing alarm information shown in FIG. 1.

Referring to FIG. 5, the notification message screen displayed on the apparatus for changing alarm information shown in FIG. 1 includes a before-change alarm 510, an after-change alarm 520, and a notification message 530.

The before-change alarm 510 corresponds to alarm time directly set by a user. While the before-change alarm 510 is being sounded, the location of the user and time may be checked.

The after-change alarm 520 corresponds to alarm time changed by the apparatus for changing alarm information based on a weather condition, and chiefly corresponds to the time that is ahead of the time of the before-change alarm 510.

The notification message 530 is a message that is output to the user along with the after-change alarm 520, and may output the cause of the change in the alarm time in the form of a message.

Figure 6:
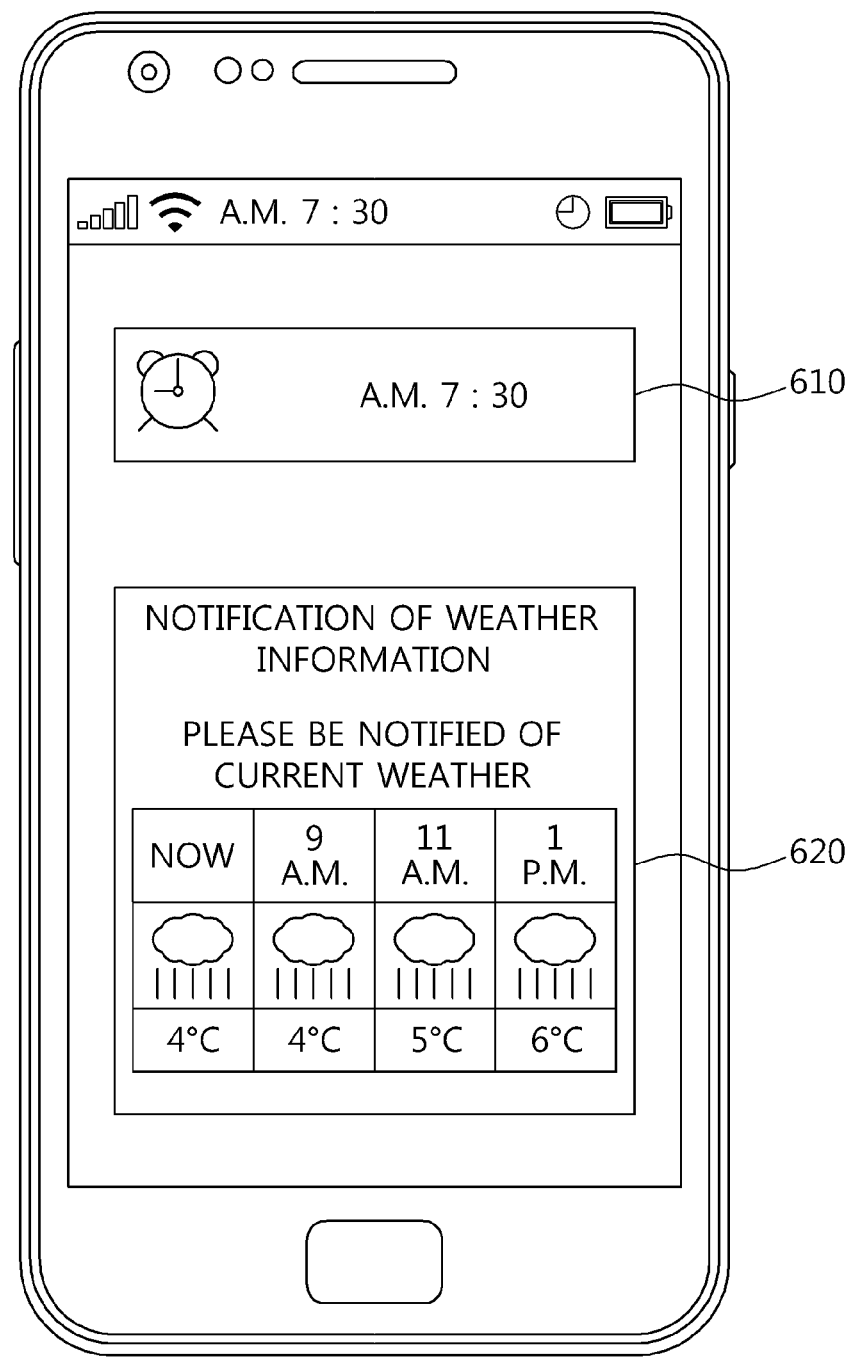
FIG. 6 is a diagram showing an example of a weather information notification screen displayed on the apparatus for changing alarm information shown in FIG. 1.

FIG. 6 is a diagram showing an example of a weather information notification screen displayed on the apparatus for changing alarm information shown in FIG. 1.

Referring to FIG. 6, the weather information notification screen displayed on the apparatus for changing alarm information shown in FIG. 1 includes an alarm 610 and a weather report message 620.

The alarm 610 corresponds to alarm time directly set by a user. While the alarm 610 is being sounded, the location of the user and time may be checked.

The weather report message 620 is a message via which weather information at the current location of the user or a destination is output. When alarm time cannot be changed because the number of times the storage has been performed in the weather database is smaller than the preset number of times regarding storage, the weather report message 620 may be output to the user, and thus the user is enabled to prepare for a bad weather condition.

Figure 7:
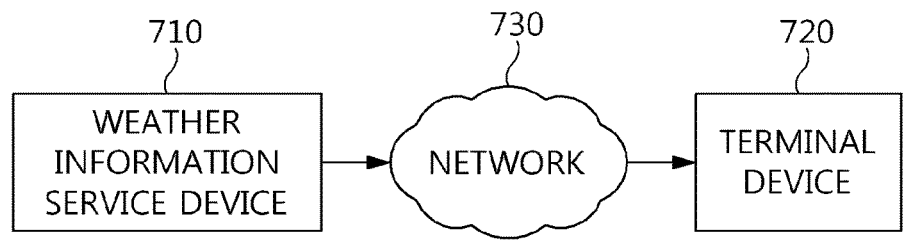
FIG. 7 is a block diagram showing a weather information service system according to an embodiment of the present invention.

FIG. 7 is a block diagram showing a weather information service system according to an embodiment of the present invention.

Referring to FIG. 7, the weather information service system according to the embodiment of the present invention includes a weather information service device 710, a terminal device 720, and a network 730.

The weather information service device 710 receives a weather forecast, collects real-time observation data on a weather state, determines whether a gap alarm condition is satisfied based on the gap between the real-time observation data and the weather forecast, and, if the gap alarm condition has been satisfied, generates and transmits an alarm corresponding to the gap alarm condition.

In this case, the weather information service device 710 may determine whether the satisfaction of the gap alarm condition has been achieved by taking into account any one or more of the type of gap between the real-time observation data and the weather forecast, the size of the gap, the duration for which the gap has been maintained outside a preset reference range, and the tendency of the gap.

For example, the weather information service device 710 may determine that the gap alarm condition has been satisfied if a gap in temperature has been maintained in the state of 5° C. or higher for one hour.

In this case, the weather information service device 710 may determine whether the satisfaction of the gap alarm condition has been achieved using the combination of conditions based on two or more variables included in the gap.

For example, if atmospheric pressure decreases, a gap in atmospheric pressure increases, humidity increases and also a gap in humidity increases, the weather information service device 710 may determine that the gap alarm condition has been satisfied because a rainfall probability increases.

In this case, the weather information service device 710 may determine whether the gap alarm condition has been satisfied by taking into account the correlation between a gap and the tendency of actual weather, which is analyzed using past data.

For example, if there is past data indicating that precipitation increases when atmospheric pressure decreases and humidity increases, it is determined whether the gap alarm condition has been satisfied by taking into account the past data.

In this case, an alarm may include the combination of one or more of a character, a sound and an icon.

The terminal device 720 receives and displays the alarm.

In this case, the terminal device 720 may include a digital device, such as a Personal Computer (PC), a notebook computer, a mobile phone, a tablet PC, a car navigation device, a smart phone, a Personal Digital Assistant (PDA), or a Portable Multimedia Player (PMP).

The network 730 provides a path that transfers information between the weather information service device 710 and the terminal device 720, and is based on a concept including a network and networks that will be developed in the future. For example, the network 730 may be a network for short distance wireless communication, such as Near Field Communication (NFC), using Wi-Fi, Wi-Fi Direct, Bluetooth and Radio-Frequency Identification (RFID), may be an IP network that provides the service of the transmission and reception of a large amount of data via the Internet Protocol (IP) and seamless data service, may be an All IP network based on an IP network structure that integrates different networks based on the IP, and may include the combination of one or more of third generation mobile communication networks including a wired network, a Wireless Broadband (Wibro) network and a WCDMA network, 3.5th generation mobile communication networks including a High Speed Downlink Packet Access (HSDPA) network and an LTE network, fourth generation mobile communication networks including an LTE advanced network, a satellite communication network, and a Wi-Fi network. Furthermore, the network 730 may be one of 5th generation mobile communication networks that are being currently developed in various countries and will be actively used in the future.

Figure 8:
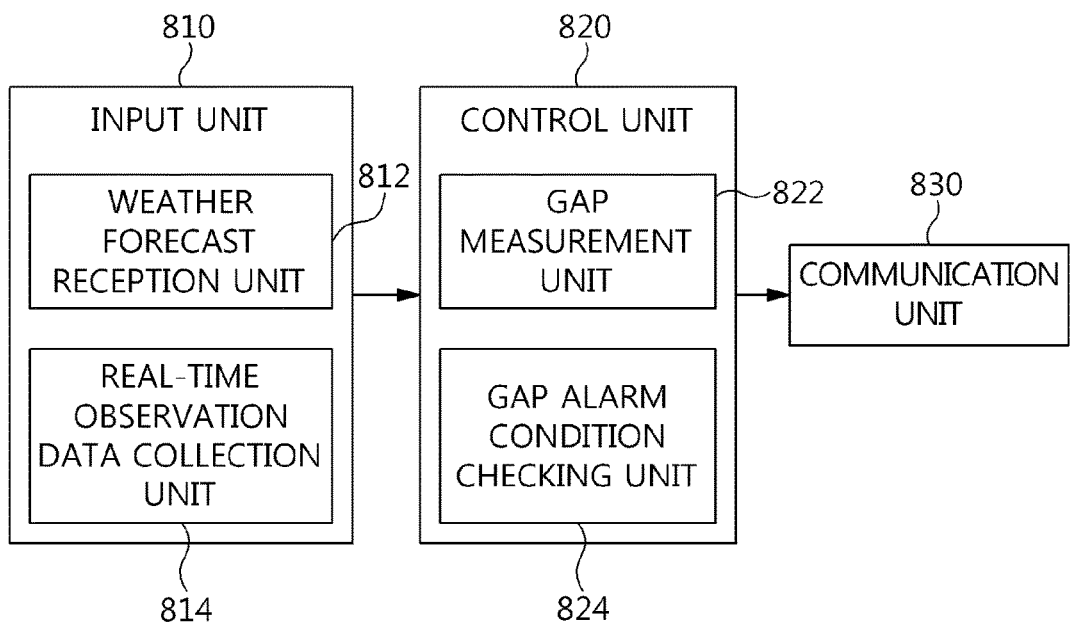
FIG. 8 is a block diagram showing an example of weather information service device shown in FIG. 7.

FIG. 8 is a block diagram showing an example of the weather information service device shown in FIG. 7.

Referring to FIG. 8, the weather information service device shown in FIG. 7 includes an input unit 810, a control unit 820, and a communication unit 830.

The input unit 810 includes a weather forecast reception unit 812 and a real-time observation data collection unit 814.

The weather forecast reception unit 812 receives a weather forecast in each regular period.

For example, the weather forecast reception unit 812 may receive a weather forecast every six hours.

The real-time observation data collection unit 814 collects real-time observation data on a weather state in each regular period.

For example, the real-time observation data collection unit 814 may collect real-time observation data on a weather state every one hour and 30 minutes.

In this case, although a weather forecast can be correctly compensated for in inverse proportion to the length of the period in which real-time observation data is collected, it is necessary to set an appropriate interval because, when the period is excessively short, the load of the weather information service device increases and an alarm may be excessively frequently transmitted to a user.

In this case, the real-time observation data collection unit 814 may set the second period to a shorter period when bad weather information including any one or more of rainfall, snowfall, strong wind and fog is observed in the real-time observation data.

For example, when rainfall is observed in the real-time observation data, the real-time observation data collection unit 814 may collect real-time observation data on a weather state every one hour shorter than one hour and 30 minutes, which is a normal period.

Accordingly, in a period corresponding to a bad weather state in which a user is more concerned about a change in weather, real-time observation data may be collected, whether the gap alarm condition has been satisfied may be determined, and weather information may be provided to the user, more frequently than in a normal situation.

In this case, the real-time observation data collection unit 814 may set any one or more of an increase and decrease in the second period by taking into account any one or more of the type of gap between the real-time observation data and the weather forecast, the size of the gap, the duration for which the gap has been maintained outside a preset reference range, and the tendency of the gap.

For example, in a period during which a gap in atmospheric pressure between the real-time observation data and the weather forecast increases and thus a change in the weather state is predicted, the real-time observation data collection unit 814 may collect real-time observation data on a weather state every one hour shorter than the normal period.

The control unit 820 includes a gap measurement unit 822 and a gap alarm condition checking unit 824.

The gap measurement unit 822 measures the gap between the real-time observation data and the weather forecast.

In this case, the gap measurement unit 822 may measure the gap between the real-time observation data and the weather forecast for any one or more of temperature, atmospheric pressure, humidity, the direction of wind, the speed of wind, snowfall, the amount of fog and precipitation. Alternatively, the gap between the real-time observation data and the weather forecast may be measured for any two or more thereof.

In this case, the gap measurement unit 822 may measure the gap during periods excluding a preset interval before and after the time at which the weather forecast is received.

For example, the gap measurement unit 822 may measure the gap during periods excluding a period from 45 minutes to 30 minutes before and after the time at which the weather forecast is received.

Accordingly, the gap is not measured at the time at which the weather forecast will be released and received soon and at the time at which a gap is expected to rarely occur because a long time has not passed after the weather forecast was released and received, and thus the load of the weather information service device can be reduced.

The gap alarm condition checking unit 824 determines whether the gap alarm condition has been satisfied based on the gap.

In this case, the gap alarm condition checking unit 824 may determine whether the satisfaction of the gap alarm condition has been achieved by taking into account any one or more of the type of gap between the real-time observation data and the weather forecast, the size of the gap, the duration for which the gap has been maintained outside a preset reference range, and the tendency of the gap.

For example, the gap alarm condition checking unit 824 may determine that the gap alarm condition has been satisfied if a gap in temperature has been maintained in the state of 5° C. or higher for one hour.

In this case, the gap alarm condition checking unit 824 may determine whether the satisfaction of the gap alarm condition has been achieved using the combination of conditions based on two or more variables included in the gap.

For example, if atmospheric pressure decreases, a gap in atmospheric pressure increases, humidity increases and also a gap in humidity increases, the gap alarm condition checking unit 824 may determine that the gap alarm condition has been satisfied because a rainfall probability increases.

In this case, the gap alarm condition checking unit 824 may determine whether the gap alarm condition has been satisfied by taking into account the correlation between a gap and the tendency of actual weather, which is analyzed using past data.

For example, if there is past data indicating that precipitation increases when atmospheric pressure decreases and humidity increases, it is determined whether the gap alarm condition has been satisfied by taking into account the past data.

The communication unit 830 generates and transmits an alarm corresponding to the gap alarm condition if the gap alarm condition has been satisfied.

In this case, the alarm may include the combination of one or more of a character, a sound and an icon.

Figure 9:
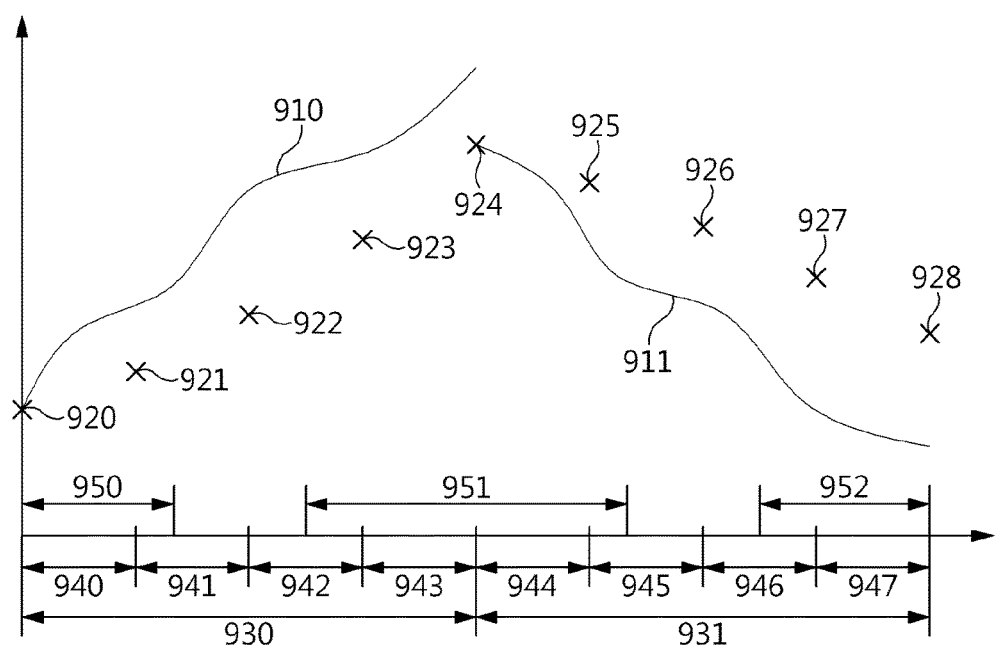
FIG. 9 is a diagram showing a graph of weather forecasts and real-time observation data according to an embodiment of the present invention.

FIG. 9 is a diagram showing a graph of weather forecasts and real-time observation data according to an embodiment of the present invention.

Referring to FIG. 9, in the graph of weather forecasts and real-time observation data according to the embodiment of the present invention, weather forecasts 910 to 911, real-time observation data 920 to 928, periods 930 to 931 in which weather forecasts are received, periods 940 to 947 in which real-time observation data is collected, and preset intervals 950 to 952 after and before the time at which weather forecasts are received.

The weather forecasts 910 to 911 are received in regular periods 930 to 931.

For example, the weather forecasts 910 to 911 may be received every six hours.

The real-time observation data 920 to 928 is collected in regular periods 940 to 947.

For example, the real-time observation data may be received every one hour and 30 minutes.

When the real-time observation data 920 to 928 is collected, the weather information service device measures gaps, and determines whether the gap notification condition has been satisfied. However, gaps are not measured for the real-time observation data 920 to 921, 923 to 925, and 927 to 928 collected during periods corresponding to the preset intervals 950 to 952 after and before the time at which weather forecasts are received.

For example, the preset intervals 950 to 952 after and before the time at which weather forecasts are received may be each set to a period from 45 minutes to 30 minutes before and after the time at which the weather forecast is received.

In this case, the real-time observation data collection unit may set each of the periods 940 to 947 to a shorter period when bad weather information including any one or more of rainfall, snowfall, strong wind and fog is observed in the real-time observation data 920 to 928.

For example, when rainfall is observed in the real-time observation data 920 to 928, the real-time observation data collection unit may collect real-time observation data on a weather state every one hour that is shorter than one hour and 30 minutes, which corresponds to each of the normal periods 940 to 947.

Accordingly, in a period corresponding to a bad weather state in which a user is more concerned about a change in weather, the real-time observation data 920 to 928 may be collected, whether the gap alarm condition has been satisfied may be determined, and weather information may be provided to the user, more frequently than in a normal situation.

In this case, the real-time observation data collection unit may set any one or more of an increase and decrease in the second period by taking into account any one or more of the type of gap between the real-time observation data and the weather forecast, the size of the gap, the duration for which the gap has been maintained outside a preset reference range, and the tendency of the gap.

For example, in a period during which gaps in atmospheric pressure between the real-time observation data 920 to 928 and the weather forecasts 910 to 911 increase and thus a change in the weather state is predicted, the real-time observation data collection unit may collect real-time observation data on a weather state every one hour shorter than the normal periods 940 to 947.

In this case, although the load of the weather information service device can decrease in proportion to the length of the preset intervals 950 to 952 after and before the time at which weather forecasts are received, it is necessary to set appropriate intervals because, when the intervals are set to excessively long periods, the number of time the gap is measured.

Figure 10:
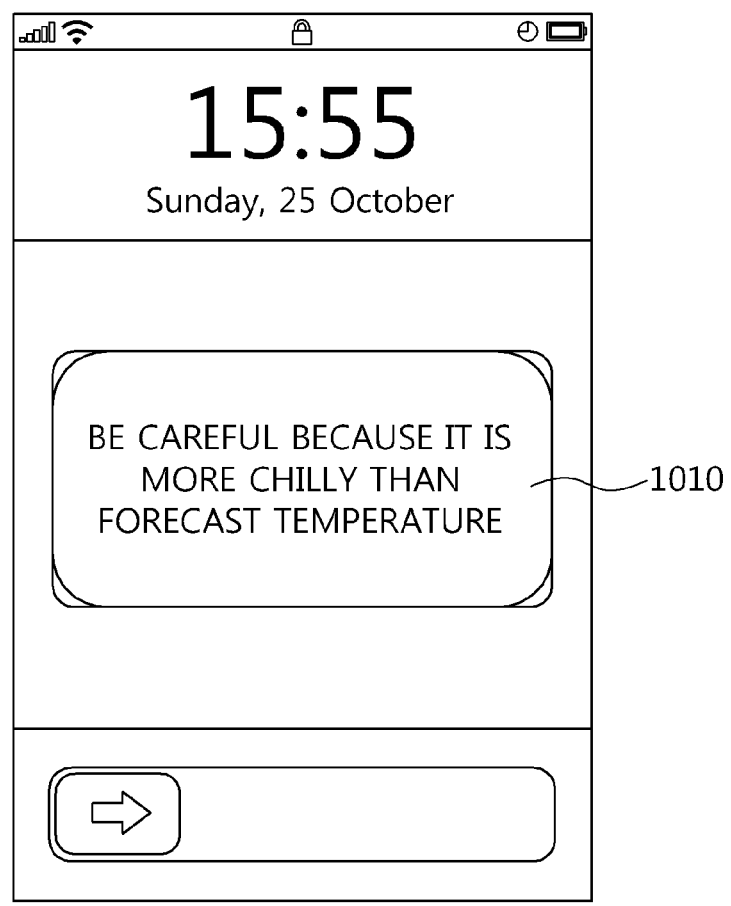
FIG. 10 is a diagram showing an example of a weather information service screen displayed on the terminal device shown in FIG. 7.

FIG. 10 is a diagram showing an example of a weather information service screen displayed on the terminal device shown in FIG. 7.

Referring to FIG. 10, the screen in which an alarm generated and transmitted by the weather information service device according to the embodiment of the present invention is displayed on the terminal device includes an alarm 1010.

In this case, the alarm 1010 may include the combination of any one or more of a character, a sound and an icon.

For example, if a gap in temperature increases and thus it is determined that the gap notification condition has been satisfied, the weather information service device may generate and transmit a message, such as the alarm 1010.

Figure 11:
FIG. 11 is a diagram showing another example of a weather information service screen displayed on the terminal device shown in FIG. 7.

FIG. 11 is a diagram showing another example of a weather information service screen displayed on the terminal device shown in FIG. 7.

Referring to FIG. 11, the screen in which an alarm generated and transmitted by the weather information service device according to the embodiment of the present invention is displayed on the terminal device includes an alarm 1110.

In this case, the alarm 1110 may include the combination of any one or more of a character, a sound and an icon.

For example, if it is determined that the gap notification condition has been satisfied based on the combination of conditions based on a gap in humidity and a gap in atmospheric pressure, the weather information service device may generate and transmit a message, such as the alarm 1011.

Figure 12:
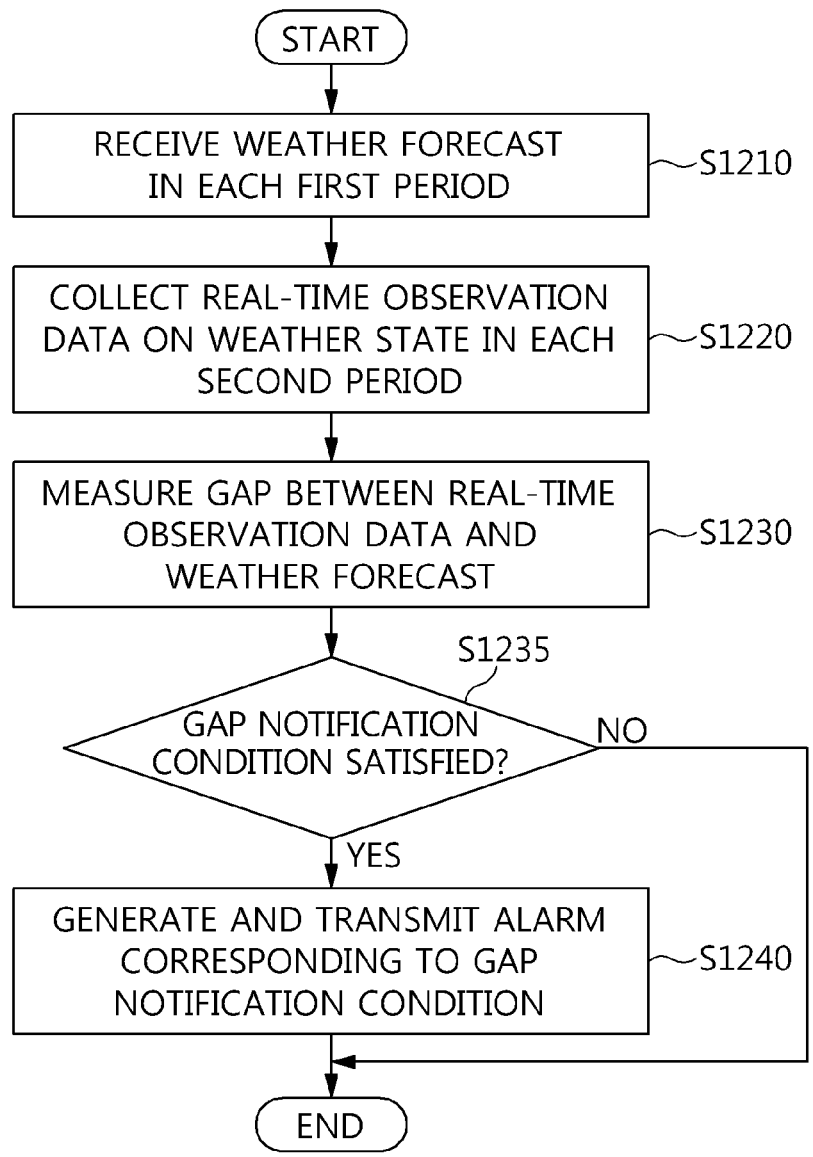
FIG. 12 is an operation flowchart showing a weather information service method according to an embodiment of the present invention.

FIG. 12 is an operation flowchart showing a weather information service method according to an embodiment of the present invention.

Referring to FIG. 12, the weather information service method according to the embodiment of the present invention receives a weather forecast in each first period at step S1210.

For example, the step of receiving a weather forecast may receive a weather forecast every six hours.

Furthermore, the weather information service method according to the embodiment of the present invention collects real-time observation data on a weather state in each second period at step S1220.

For example, the step of collecting real-time observation data may collect real-time observation data on a weather state every one hour and 30 minutes.

In this case, although a weather forecast can be correctly compensated for in inverse proportion to the length of the period in which real-time observation data is collected, it is necessary to set an appropriate interval because, when the period is excessively short, the load of the weather information service device increases and an alarm may be excessively frequently transmitted to a user.

In this case, the step of collecting real-time observation data may set the second period to a shorter period when bad weather information including any one or more of rainfall, snowfall, strong wind and fog is observed in the real-time observation data.

For example, when rainfall is observed in the real-time observation data, the step of collecting real-time observation data may collect real-time observation data on a weather state every one hour shorter than one hour and 30 minutes, which is a normal second period.

Accordingly, in a period corresponding to a bad weather state in which a user is more concerned about a change in weather, real-time observation data may be collected, whether the gap alarm condition has been satisfied may be determined, and weather information may be provided to the user, more frequently than in a normal situation.

In this case, the step of collecting real-time observation data may set any one or more of an increase and decrease in the second period by taking into account any one or more of the type of gap between the real-time observation data and the weather forecast, the size of the gap, the duration for which the gap has been maintained outside a preset reference range, and the tendency of the gap.

For example, in a period during which a gap in atmospheric pressure between the real-time observation data and the weather forecast increases and thus a change in the weather state is predicted, the step of collecting real-time observation data may collect real-time observation data on a weather state every one hour shorter than the normal second period.

Furthermore, the weather information service method according to the embodiment of the present invention measures the gap between the real-time observation data and the weather forecast at step S1230.

In this case, the step of measuring the gap may measure the gap between the real-time observation data and the weather forecast for any one or more of temperature, atmospheric pressure, humidity, the direction of wind, the speed of wind, snowfall, the amount of fog and precipitation. Alternatively, the gap between the real-time observation data and the weather forecast may be measured for any two or more thereof.

In this case, the step of measuring the gap may measure the gap during periods excluding a preset interval before and after the time at which the weather forecast is received.

For example, the step of measuring the gap may measure the gap during periods excluding a period from 45 minutes to 30 minutes before and after the time at which the weather forecast is received.

Accordingly, the gap is not measured at the time at which the weather forecast will be released and received soon and at the time at which a gap is expected to rarely occur because a long time has not passed after the weather forecast was released and received, and thus the load of the weather information service device can be reduced.

Furthermore, the weather information service method according to the embodiment of the present invention determines whether the gap alarm condition has been satisfied based on the gap at step S1235.

In this case, the step of determining whether the gap alarm condition has been satisfied may determine whether the satisfaction of the gap alarm condition has been achieved by taking into account any one or more of the type of gap between the real-time observation data and the weather forecast, the size of the gap, the duration for which the gap has been maintained outside a preset reference range, and the tendency of the gap.

For example, the step of determining whether the gap alarm condition has been satisfied may determine that the gap alarm condition has been satisfied if a gap in temperature has been maintained in the state of 5° C. or higher for one hour.

In this case, the step of determining whether the gap alarm condition has been satisfied may determine whether the satisfaction of the gap alarm condition has been achieved using the combination of conditions based on two or more variables included in the gap.

For example, if atmospheric pressure decreases, a gap in atmospheric pressure increases, humidity increases and also a gap in humidity increases, the step of determining whether the gap alarm condition may determine that the gap alarm condition has been satisfied because a rainfall probability increases.

In this case, the step of determining whether the gap alarm condition has been satisfied may determine whether the gap alarm condition has been satisfied by taking into account the correlation between a gap and the tendency of actual weather, which is analyzed using past data.

For example, if there is past data indicating that precipitation increases when atmospheric pressure decreases and humidity increases, it is determined whether the gap alarm condition has been satisfied by taking into account the past data.

Furthermore, the weather information service method according to the embodiment of the present invention generates and transmits an alarm corresponding to the gap alarm condition if the gap alarm condition has been satisfied at step S1240.

In this case, the alarm may include the combination of one or more of a character, a sound and an icon.

Figure 13:
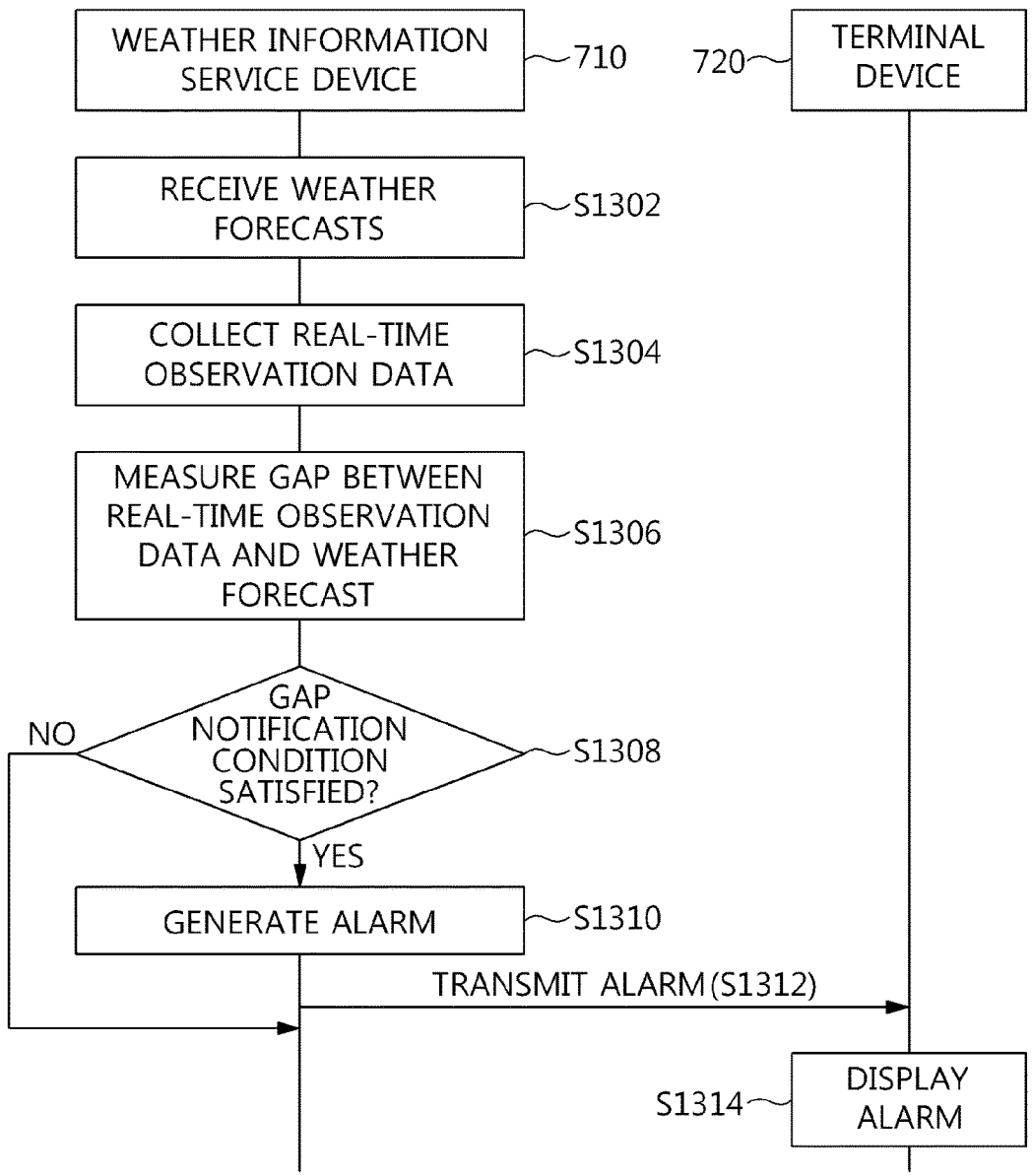
FIG. 13 is an operation flowchart showing an overall weather information service method according to an embodiment of the present invention.

FIG. 13 is an operation flowchart showing an overall weather information service method according to an embodiment of the present invention.

Referring to FIG. 13, the weather information service device 710 receives a weather forecast in each regular period at step S1302.

For example, the weather information service device 710 may receive a weather forecast every six hours.

The weather information service device 710 collects real-time observation data on a weather state in each regular period at step S1304.

For example, the weather information service device 710 may collect real-time observation data on a weather state every one hour and 30 minutes.

In this case, although a weather forecast can be correctly compensated for in inverse proportion to the length of the period in which real-time observation data is collected, it is necessary to set an appropriate interval because, when the period is excessively short, the load of the weather information service device increases and an alarm may be excessively frequently transmitted to a user.

In this case, the weather information service device 710 may set the second period to a shorter period when bad weather information including any one or more of rainfall, snowfall, strong wind and fog is observed in the real-time observation data.

For example, when rainfall is observed in the real-time observation data, the step of collecting real-time observation data may collect real-time observation data on a weather state every one hour shorter than one hour and 30 minutes, which is a normal period.

Accordingly, in a period corresponding to a bad weather state in which a user is more concerned about a change in weather, real-time observation data may be collected, whether the gap alarm condition has been satisfied may be determined, and weather information may be provided to the user, more frequently than in a normal situation.

In this case, the weather information service device 710 may set any one or more of an increase and decrease in the second period by taking into account any one or more of the type of gap between the real-time observation data and the weather forecast, the size of the gap, the duration for which the gap has been maintained outside a preset reference range, and the tendency of the gap.

For example, in a period during which a gap in atmospheric pressure between the real-time observation data and the weather forecast increases and thus a change in the weather state is predicted, the real-time observation data collection unit 814 may collect real-time observation data on a weather state every one hour shorter than the normal second period.

The weather information service device 710 measures the gap between the real-time observation data and the weather forecast at step S1306.

In this case, the weather information service device 710 may measure the gap between the real-time observation data and the weather forecast for any one or more of temperature, atmospheric pressure, humidity, the direction of wind, the speed of wind, snowfall, the amount of fog and precipitation. Alternatively, the gap between the real-time observation data and the weather forecast may be measured for any two or more thereof.

In this case, the weather information service device 710 may measure the gap during periods excluding a preset interval before and after the time at which the weather forecast is received.

For example, the weather information service device 710 may measure the gap during periods excluding a period from 45 minutes to 30 minutes before and after the time at which the weather forecast is received.

Accordingly, the gap is not measured at the time at which the weather forecast will be released and received soon and at the time at which a gap is expected to rarely occur because a long time has not passed after the weather forecast was released and received, and thus the load of the weather information service device can be reduced.

The weather information service device 710 determines whether the gap alarm condition has been satisfied based on the gap at step S1308.

In this case, the weather information service device 710 may determine whether the satisfaction of the gap alarm condition has been achieved by taking into account any one or more of the type of gap between the real-time observation data and the weather forecast, the size of the gap, the duration for which the gap has been maintained outside a preset reference range, and the tendency of the gap.

For example, the weather information service device 710 may determine that the gap alarm condition has been satisfied if a gap in temperature has been maintained in the state of 5° C. or higher for one hour.

In this case, the weather information service device 710 may determine whether the satisfaction of the gap alarm condition has been achieved using the combination of conditions based on two or more variables included in the gap.

For example, if atmospheric pressure decreases, a gap in atmospheric pressure increases, humidity increases and also a gap in humidity increases, the weather information service device 710 may determine that the gap alarm condition has been satisfied because a rainfall probability increases.

In this case, the weather information service device 710 may determine whether the gap alarm condition has been satisfied by taking into account the correlation between a gap and the tendency of actual weather, which is analyzed using past data.

For example, if there is past data indicating that precipitation increases when atmospheric pressure decreases and humidity increases, it is determined whether the gap alarm condition has been satisfied by taking into account the past data.

The weather information service device 710 generates an alarm corresponding to the gap alarm condition if the gap alarm condition has been satisfied at step S1310.

In this case, the alarm may include the combination of one or more of a character, a sound and an icon.

The weather information service device 710 transmits the alarm to the terminal device 720 at step S1312.

The terminal device 720 displays the alarm on a screen at step S1314.

The steps shown in each of FIGS. 12 and 13 may be performed in the sequence shown in FIG. 12 or 13, in a sequence reverse to the former sequence, or concurrently.

Figure 14:
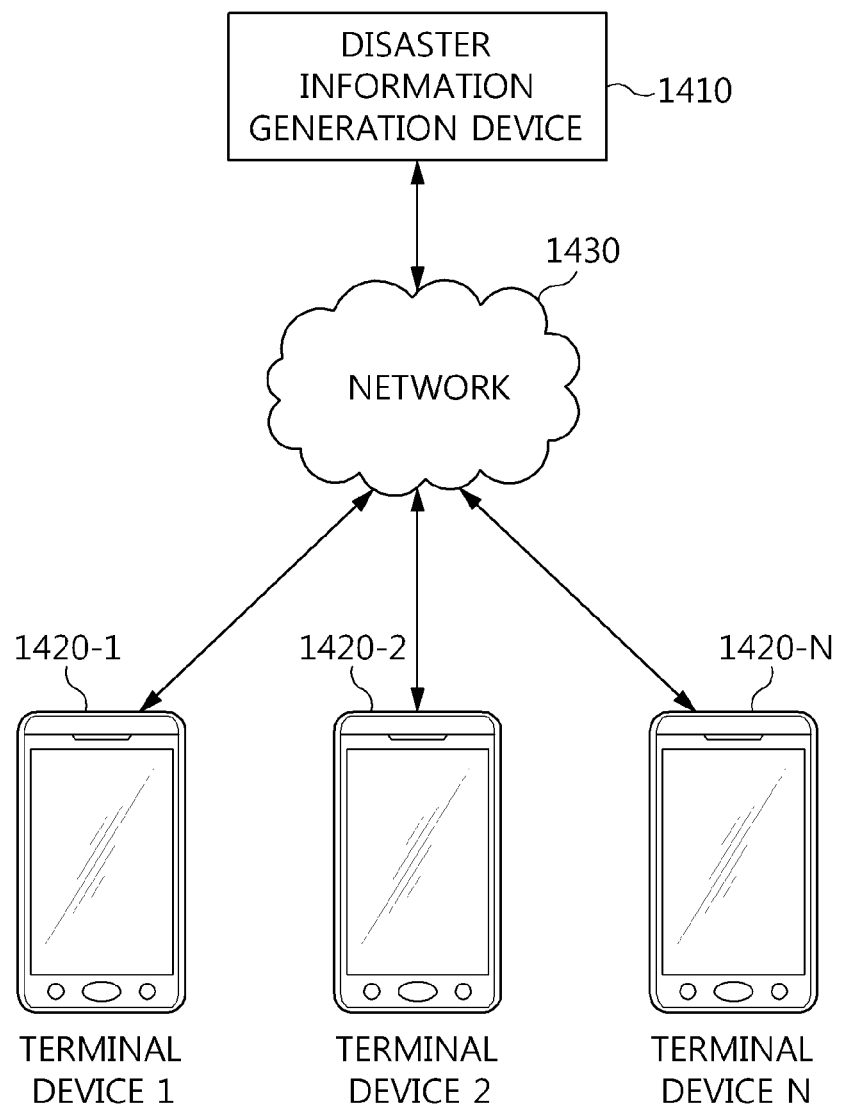
FIG. 14 is a block diagram showing a disaster information generation system according to an embodiment of the present invention.

FIG. 14 is a block diagram showing a disaster information generation system according to an embodiment of the present invention.

Referring to FIG. 14, the disaster information generation system according to the embodiment of the present invention includes a disaster information generation device 1410, terminal devices 1410-1 to 1410-N, and a network 1430.

The disaster information generation device 1410 receives a report message, including location information and weather information, from the terminal devices 1410-1 to 1410-N in order to determine a disaster situation, and calculates a weight by analyzing the weather information in order to determine the urgency level of the disaster situation determined via the report message. Furthermore, the disaster information generation device 1410 assigns a priority to the disaster situation by applying the weight to the disaster situation, and generates a disaster information list by applying the priority to an area corresponding to the location information.

In this case, a higher priority may be assigned to the disaster situation in proportion to the value of the weight.

In this case, the disaster situation may be located at the higher position of the disaster information list in proportion to the priority of the disaster situation. For example, if an accident having a higher priority because of a higher weight analyzed via weather information is reported even when a disaster situation is reported via a report message earlier, the accident may be located at a higher position of the list than the earlier reported disaster situation.

In this case, the disaster information list may include the types of disaster situations, the urgency levels of the disaster situations, the times at which report messages corresponding to the disaster situations were received first, location information, and the like.

In this case, the weight may be calculated for a bad weather condition, such as a typhoon, a windstorm, a flood, a drought, a heavy snowfall, hail, thunder and lightning, a high temperature, an extremely low temperature or the like. For example, in the case of a heavy snowfall, the weight may be determined via the amount of snowfall; or in the case of a typhoon or windstorm, the weight may be calculated via the speed of wind or the like.

In an embodiment, the disaster information generation device 1410 may generate a disaster information map that visually represents the urgency levels of the disaster situations corresponding to the disaster information list in respective unit areas.

In this case, the disaster information map may be generated visually differently depending on the types of disaster situations. For example, when an area having a heavy snowfall and an area having both a heavy snowfall and a snowstorm are reported by a user, the two areas may be efficiently distinguished from each other by adding different colors, icons or the like so that the two areas can be visually distinguished when they are represented on the disaster information map.

The terminal devices 1410-1 to 1410-N acquire the location information of an area tagged by a user, and collects weather information corresponding to the location information. For example, the terminal devices 1410-1 to 1410-N measure a location using network signals or satellite signals. Although a method of measuring a location using network signals has lower accuracy than a method of measuring a location using satellite signals, it can determine a location very rapidly. Furthermore, the terminal devices 1410-1 to 1410-N transmit a report message, including disaster information, location information and weather information, to the disaster information generation device so that the disaster information generation device generates a disaster information list by analyzing the disaster information including the location information and the weather information.

In an embodiment, the terminal devices 1410-1 to 1410-N may transmit a photo or image data corresponding to the disaster information in connection with a report message. For example, when a heavy snowfall is reported, notification of the amount of heavy snowfall may be provided by transmitting a photo or image of the depth of snow together with a report message.

The network 1430 provides a path adapted to transfer information between the disaster information generation device 1410 and the terminal devices 1410-1 to 1410-N. The network 1430 is based on a concept including conventional networks and networks that can be developed in the future. For example, the network 1430 may include any one of or the combination of two or more of: wired/wireless short distance communication networks adapted to provide communication to various types of information devices within a limited area; a mobile communication network adapted to provide communication between mobile terminals and between a mobile terminal and the outside of the mobile terminal; a satellite communication network adapted to provide communication between earth stations using satellites; and wired/wireless communication networks. Furthermore, in FIG. 14, a network used between the disaster information generation device 1410 and the terminal device 1420-1 may be different from or the same as a network used between the disaster information generation device 1410 and the terminal device 1420-2 or terminal device 1420-N.

Figure 15:
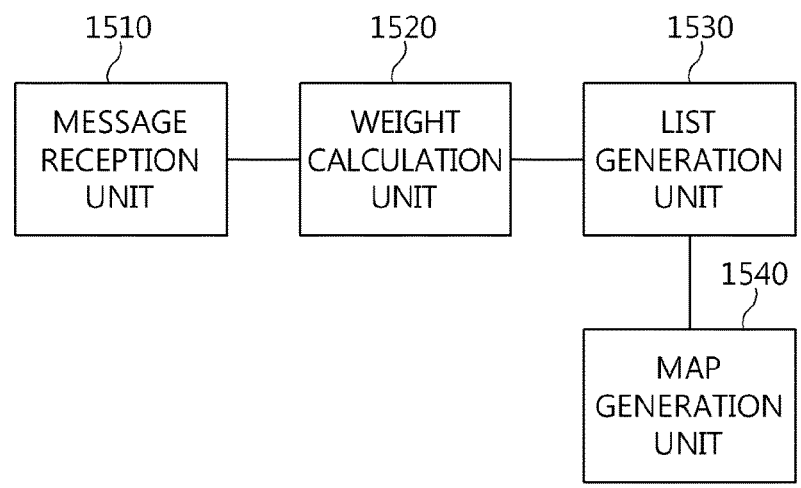
FIG. 15 is a block diagram showing an example of the disaster information generation device shown in FIG. 14.

FIG. 15 is a block diagram showing an example of the disaster information generation device shown in FIG. 14.

Referring to FIG. 15, the disaster information generation device 1410 shown in FIG. 14 includes a message reception unit 1510, a weight calculation unit 1520, a list generation unit 1530, and a map generation unit 1540.

The message reception unit 1510 receives a report message, including location information and weather information, from a terminal device in order to determine each disaster situation.

The weight calculation unit 1520 calculates a weight by analyzing the weather information in order to determine the urgency level of the disaster situation determined via the report message.

In this case, the weight may be calculated for a bad weather condition, such as a typhoon, a windstorm, a flood, a drought, a heavy snowfall, hail, thunder and lightning, a high temperature, an extremely low temperature or the like. For example, in the case of a heavy snowfall, the weight may be determined via the amount of snowfall; or in the case of a typhoon or windstorm, the weight may be calculated via the speed of wind or the like.

Furthermore, the list generation unit 1530 assigns a priority to the disaster situation by applying the weight to the disaster situation, and generates a disaster information list by applying the priority to an area corresponding to the location information.

In this case, a higher priority may be assigned to the disaster situation in proportion to the value of the weight.

In this case, the disaster situation may be located at the higher position of the disaster information list in proportion to the priority of the disaster situation. For example, if an accident having a higher priority because of a higher weight analyzed via weather information is reported even when a disaster situation is reported via a report message earlier, the accident may be located at a higher position of the list than the earlier reported disaster situation.

In this case, the disaster information list may include the types of disaster situations, the urgency levels of the disaster situations, the times at which report messages corresponding to the disaster situations were received first, location information, and the like.

The map generation unit 1540 may generate a disaster information map that visually represents the urgency levels of the disaster situations corresponding to the disaster information list in respective unit areas.

In this case, the disaster information map may be generated visually differently depending on the types of disaster situations. For example, when an area having a heavy snowfall and an area having both a heavy snowfall and a snowstorm are reported by a user, the two areas may be efficiently distinguished from each other by adding different colors, icons or the like so that the two areas can be visually distinguished when they are represented on the disaster information map.

Figure 16:
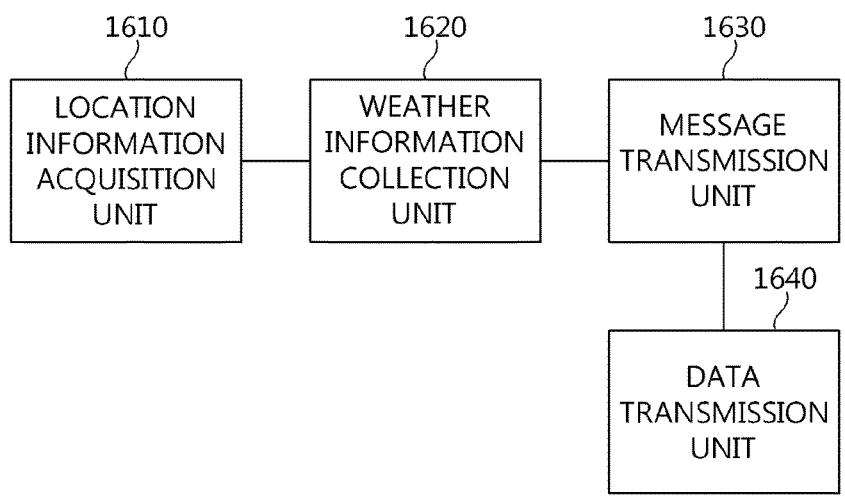
FIG. 16 is a block diagram showing an example of the terminal device shown in FIG. 14.

FIG. 16 is a block diagram showing an example of the terminal device shown in FIG. 14.

Referring to FIG. 16, the terminal device shown in FIG. 14 includes a location information acquisition unit 1610, a weather information collection unit 1620, a message transmission unit 1630, and a data transmission unit 1640.

The location information acquisition unit 1610 acquires the location information of an area tagged by a user.

The weather information collection unit 1620 collects weather information corresponding to the location information.

The message transmission unit 1630 transmits a report message, including disaster information, location information and weather information, to the disaster information generation device so that the disaster information generation device generates a disaster information list by analyzing the disaster information including the location information and the weather information.

The data transmission unit 1640 transmits a photo or image data corresponding to the disaster information in connection with a report message. For example, when a heavy snowfall is reported, notification of the amount of heavy snowfall may be provided by transmitting a photo or image of the depth of snow together with a report message.

Figure 17:
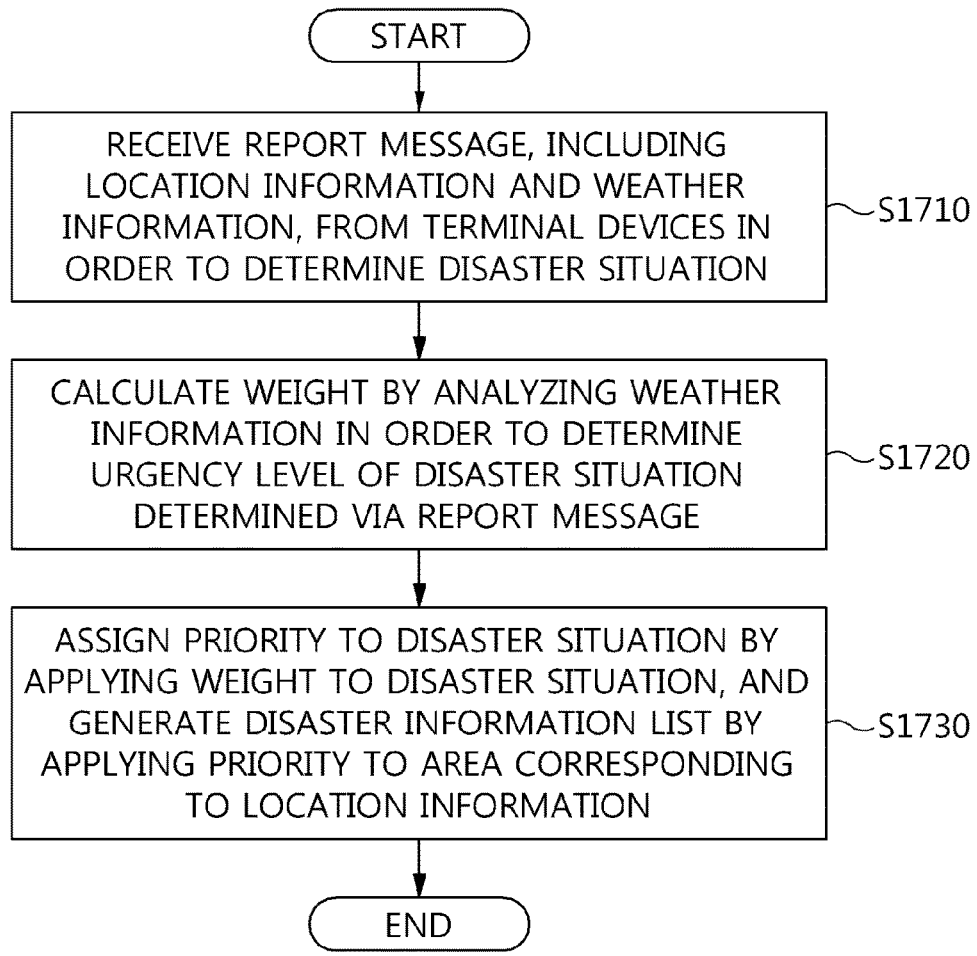
FIG. 17 is an operation flowchart showing a disaster information generation method (from the point of view of a server) according to an embodiment of the present invention.

FIG. 17 is an operation flowchart showing a disaster information generation method (from the point of view of a server) according to an embodiment of the present invention.

Referring to FIG. 17, the disaster information generation method according to the embodiment of the present invention receives a report message, including location information and weather information, in order to determine each disaster situation at step S1710.

Furthermore, the disaster information generation method according to the embodiment of the present invention calculates a weight by analyzing the weather information in order to determine the urgency information of the disaster situation determined via the report message at step S1720.

In this case, the weight may be calculated for a bad weather condition, such as a typhoon, a windstorm, a flood, a drought, a heavy snowfall, hail, thunder and lightning, a high temperature, an extremely low temperature or the like. For example, in the case of a heavy snowfall, the weight may be determined via the amount of snowfall; or in the case of a typhoon or windstorm, the weight may be calculated via the speed of wind or the like.

Furthermore, the disaster information generation method according to the embodiment of the present invention assigns a priority to the disaster situation by applying the weight to the disaster situation, and generates a disaster information list by applying the priority to an area corresponding to the location information at step S1730.

In this case, a higher priority may be assigned to the disaster situation in proportion to the value of the weight.

In this case, the disaster situation may be located at the higher position of the disaster information list in proportion to the priority of the disaster situation. For example, if an accident having a higher priority because of a higher weight analyzed via weather information is reported even when a disaster situation is reported via a report message earlier, the accident may be located at a higher position of the list than the earlier reported disaster situation.

In this case, the disaster information list may include the types of disaster situations, the urgency levels of the disaster situations, the times at which report messages corresponding to the disaster situations were received first, location information, and the like.

Although not shown in FIG. 17, the disaster information generation method according to the embodiment of the present invention may generate a disaster information map that visually represents the urgency levels of the disaster situations corresponding to the disaster information list in respective unit areas.

In this case, the disaster information map may be generated visually differently depending on the types of disaster situations. For example, when an area having a heavy snowfall and an area having both a heavy snowfall and a snowstorm are reported by a user, the two areas may be efficiently distinguished from each other by adding different colors, icons or the like so that the two areas can be visually distinguished when they are represented on the disaster information map.

Figure 18:
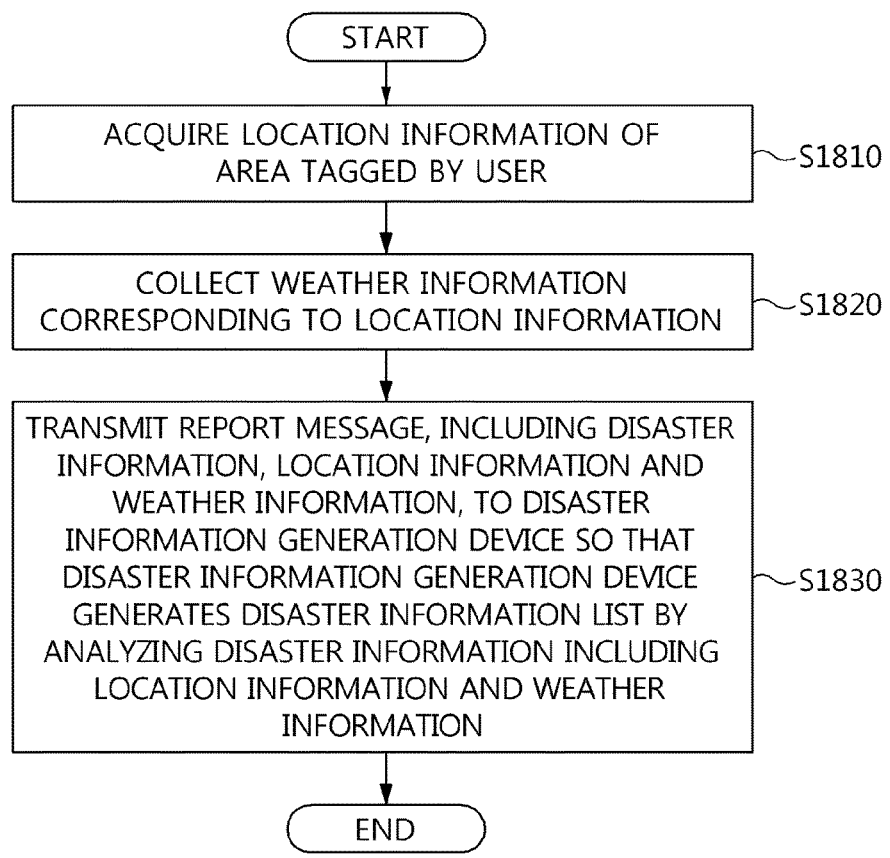
FIG. 18 is an operation flowchart showing a disaster information generation method (from the point of view of a terminal) according to an embodiment of the present invention.

FIG. 18 is an operation flowchart showing a disaster information generation method (from the point of view of a terminal) according to an embodiment of the present invention.

Referring to FIG. 18, the disaster information generation method according to the embodiment of the present invention acquires the location information of an area tagged by a user at step S1810.

Furthermore, the disaster information generation method according to the embodiment of the present invention collects weather information corresponding to the location information at step S1820.

Furthermore, the disaster information generation method according to the embodiment of the present invention transmits a report message, including disaster information, location information and weather information, to the disaster information generation device so that the disaster information generation device generates a disaster information list by analyzing the disaster information including the location information and the weather information at step S1830.

Although not shown in FIG. 18, the disaster information generation method may transmit a photo or image data corresponding to the disaster information in connection with a report message. For example, when a heavy snowfall is reported, notification of the amount of heavy snowfall may be provided by transmitting a photo or image of the depth of snow together with a report message.

FIG. 19 is a diagram showing a disaster information list according to an embodiment of the present invention.

Referring to FIG. 19, it may be seen that in the disaster information list according to the embodiment of the present invention, the information of a disaster situation having a higher priority is located in a higher position of the disaster information list. In this case, a report message including location information and weather information may be received from a terminal device in order to determine each disaster situation, and a priority may be assigned to the disaster situation based on a weight calculated by analyzing the received weather information.

The information of the disaster situation entered in the disaster information list may include a location at which a disaster occurred, the type of disaster, and the report time at which the report message was received from the terminal device first. In this case, the location at which the disaster occurred may be determined via the location information received along with the report message. Furthermore, the type of disaster may be determined from the report message or from the data of a photo and a moving image received along with the report message. Furthermore, when report messages related to the disaster information of the same area are received from various users, the time at which a first report message was received may be selected as the report time.

Figure 20:
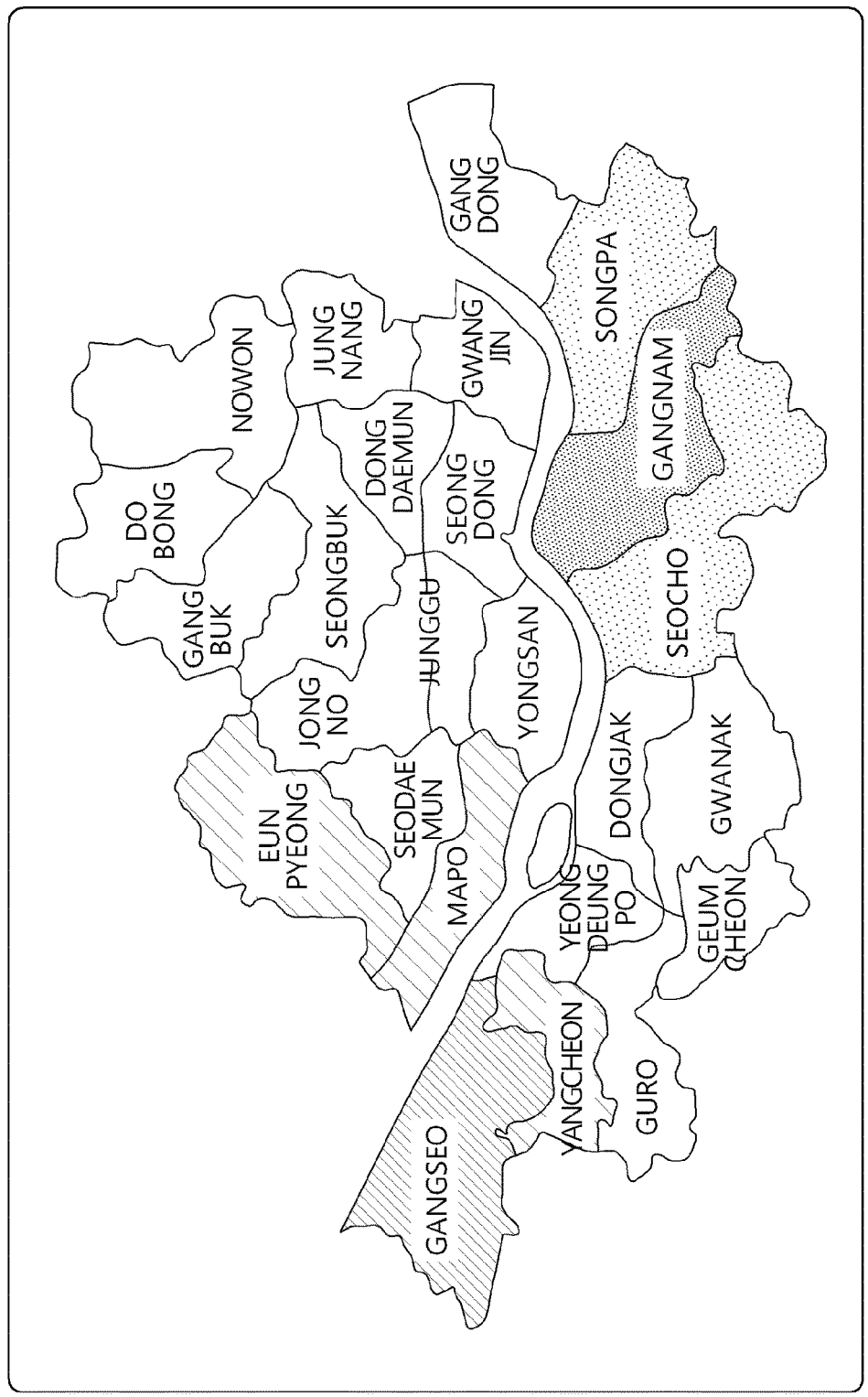
FIG. 20 is a diagram showing a disaster information map according to an embodiment of the present invention.

FIG. 20 is a diagram showing a disaster information map according to an embodiment of the present invention.

Referring to FIG. 20, the disaster information map according to the embodiment of the present invention may visually represent the type of disaster and the urgency level of a disaster situation. Referring to FIG. 20, it may be seen that report messages were received from Gangseo, Eunpyeong, Mapo and Yangcheon areas around Gangseo-gu and Gangnam, Seocho and Songpa areas around Gangnam-gu and a disaster information map was generated. In this case, it may be determined that different disaster situations occurred in the Gangseo, Eunpyeong, Mapo and Yangcheon areas and the Gangnam, Seocho and Songpa areas via the visual effect of the disaster information map. Furthermore, a representation may be made such that the urgency levels of the Gangseo area and the Gangnam area are emphasized compared to the other areas and thus a person in charge of disaster prevention can easily identify the two corresponding areas. In this case, visual differences may be assigned to disaster situations by representing areas using colors based on the respective disaster situations.

As described above, the types and urgency levels of various disaster situations are represented so that they can be determined visually easily, and thus a person in charge of disaster prevention can efficiently determine all the disaster situations and rapidly deal with the disaster situations.

Figure 21:
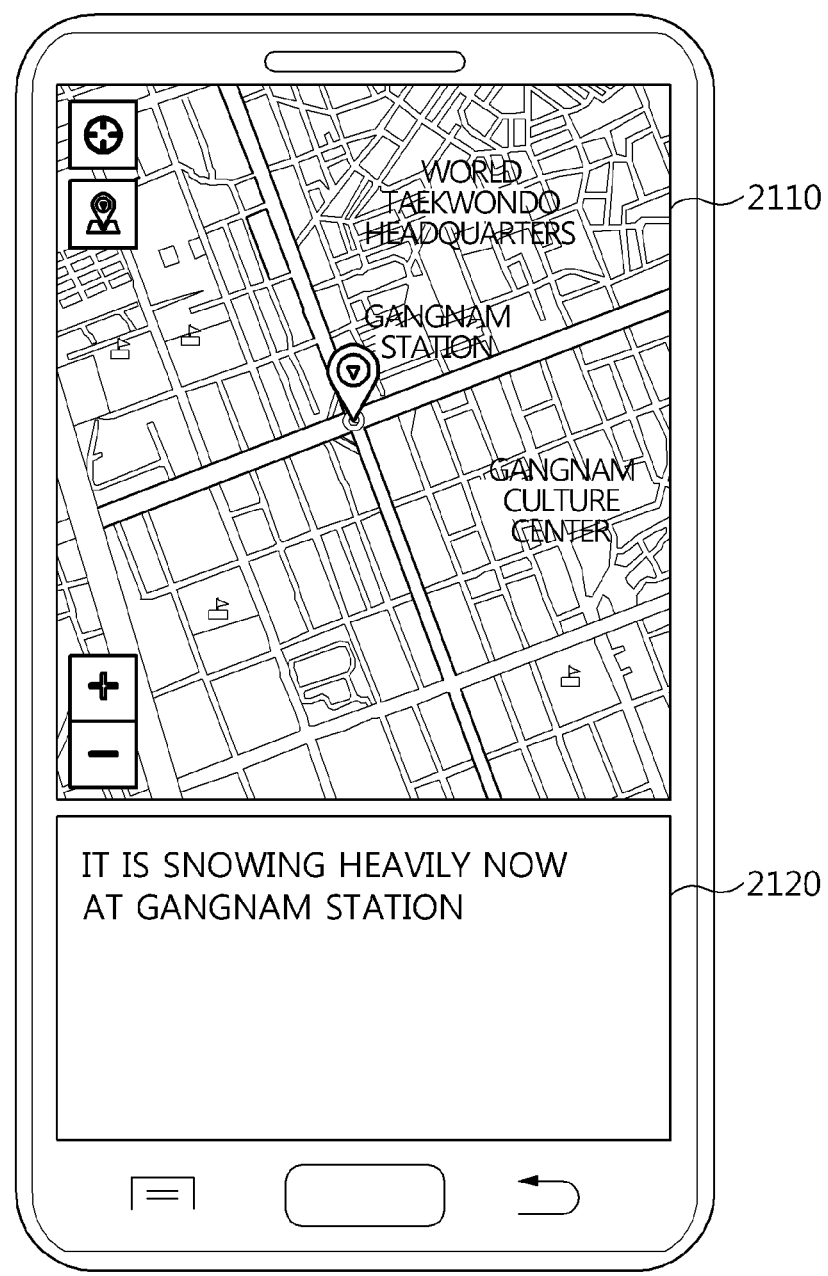
FIG. 21 is a diagram showing an example of a report screen displayed on the terminal device shown in FIG. 14.

FIG. 21 is a diagram showing an example of a report screen displayed on the terminal device shown in FIG. 14.

Referring to FIG. 21, the report screen displayed on the terminal device shown in FIG. 14 includes a report location map 2110 and a report message input window 2120.

The location information of a user may be indicated on the report location map 2110 by acquiring the location information. In this case, when a current location cannot be acquired, the user searches for and tags a location on the report location map 2110, thereby transmitting location information to the disaster information generation device.

The report message input window 2120 may be freely created as a window in which a user enters the content of a report. In this case, the length of the report message may be a preset length, and photo or moving image data may be additionally attached thereto.

In this case, when the report message created as described above is transmitted to the disaster information generation device, weather information corresponding to information about a location at which a disaster occurred is acquired and transmitted along with the report message.

A computer-readable medium appropriate to the storage of computer program instructions and data includes, for example, magnetic media such as a hard disk, a floppy disk and magnetic tape, optical media such as compact disk (CD)-read only memory (ROM) and a digital versatile disk (DVD), magneto-optical media such as a floptical disk, and semiconductor memory such as ROM, random access memory (RAM), flash memory, Erasable Programmable ROM (EPROM) and Electrically Erasable Programmable (EEPROMROM). A processor or memory may be supplemented or integrated with a specific purpose logic circuit. Examples of program instructions may include high-level language code executed by a computer using an interpreter as well as machine code created by a compiler. The hardware apparatus may function as at least one software module configured to perform the operation of the present invention, and vice versa.

While this specification contains many specific implementation details, these should not be construed as limitations on the scope of any invention or of what may be claimed, but rather as descriptions of features that may be specific to particular embodiments of particular inventions. Specific features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single software product or packaged into multiple software products.

Meanwhile, the embodiments of the present invention disclosed in the present specification and the drawings are intended merely to present specific examples in order to help the understanding of the present invention, and are not intended to limit the scope of the present invention. It will be apparent to those having ordinary knowledge in the art to which the present invention pertains that other modified embodiments based on the spirit of the present invention can be made in addition to the embodiments disclosed herein.

INDUSTRIAL APPLICABILITY

According to the present invention, the correlation between a path and weather and movement time is derived and set alarm time is changed when movement time increases due to a change in weather, thereby enabling a user to prepare for the increase in movement time and thus suppressing damage attributable to tardiness. Furthermore, average movement time for a routine path is provided to the user and thus the user is enabled to use time in a planed manner, thereby contributing to the efficient management of a schedule.

Furthermore, according to the present invention, the gap between a weather forecast and an actual weather condition is measured based on weather data observed in real time between weather forecasts released at a long interval, and information about the gap may be provided to a user if a specific condition has been satisfied. Furthermore, whether a gap notification condition has been satisfied is determined based on the combination of conditions based on two or more variables included in the gap between a weather forecast and real-time observation data, and whether a gap alarm condition has been satisfied is determined by taking into account the correlation between a gap and the tendency of actual weather, which is analyzed using past data, thereby increasing the accuracy of the prediction of a change in weather and thus contributing to industrial development.

Furthermore, according to the present invention, a disaster report message including location information and weather information can be received via the terminal device of a user and an accurate disaster information list can be rapidly generated, and an area having a prominent need for disaster prevention can be efficiently determined by applying a weight calculated via weather information. Furthermore, a person in charge of disaster prevention in each area can rapidly deal with the situation because he or she can efficiently determine the overall disaster situation of the corresponding area, and an area that has been damaged by a disaster can be more rapidly restored, thereby contributing to the guarantee of the security of a city.

The invention claimed is:

1. An apparatus for changing alarm information based on weather, comprising:
    a path information generator configured to generate path information about a path routinely used by a user;
    a data collector configured to:
        check a location of the user and a time of a moment that the user is in a certain location during a period from an alarm time set by the user until the user is at a destination at predetermined intervals of a data collection period;
        determine that the user is not at the destination when the user stays for a predetermined amount of time corresponding to a threshold value of an arrival counter that is greater than a number of the data collection period;
        determine that the user is at the destination when the user stays for the predetermined amount of time corresponding to the threshold value of the arrival counter that is less than the number of the data collection period; and
        check the location of the user and the time of the user when the user is determined not to be at the destination;
    a weather information receiver configured to:
        collect weather information utilizing weather forecasts corresponding to the location of the user and the destination;
        collect the weather information at a time corresponding to the alarm time and at a time corresponding to an estimated time that the user is at the destination; and
        collect the weather information when the user is determined to be at the destination;
    a weather database configured to:
        calculate an average movement time for each weather condition of a plurality of weather conditions by storing and analyzing the location of the user, the time and the weather information; and
    an alarm updater configured to:
        calculate a change in the alarm time based on the weather information and the average movement time for each weather condition of the plurality of weather conditions; and
        adjust the alarm time by applying the change in the alarm time.

2. The apparatus of claim 1, wherein the weather information receiver is configured to calculate the estimated time that the user is at the destination based on the location of the user and the time.

3. The apparatus of claim 2, wherein the weather database is configured to:
    calculate the average movement time for each weather condition of the plurality of weather conditions based on precipitation and rainfall; and update the average movement time for each weather condition of the plurality of weather conditions whenever the location of the user, the time and the weather information are stored.

4. The apparatus of claim 1, wherein the alarm updater further comprises:
a display configured display a cause of the change in the alarm time to the user in a message form; and
a location calculator configured to measure the location of the user.

5. A weather information service device, comprising:
an inputter configured to:
receive a weather forecast in a first period; and
collect real-time observation data on a weather state in a second period;
a controller configured to:
set the second period to a shorter period than a predetermined period when a bad weather forecast is observed in the real-time observation data, wherein the bad weather forecast comprises at least one of rainfall, snowfall, strong winds or fog;
measure a gap between the real-time observation data and the weather forecast;
determine whether a gap alarm condition is fulfilled based on the gap;
measure the gap between the real-time observation data and the weather forecast based on at least one of temperature, atmospheric pressure, humidity, a direction of winds, a speed of the winds, snowfall, an amount of fog, or precipitation; and
determine whether the gap alarm condition is fulfilled based on at least one of a type of gap between the real-time observation data and the weather forecast, a size of the gap, a duration that the gap is sustained beyond a predetermined range, or a tendency of the gap; and
a communicator configured to generate and transmit an alarm corresponding to the gap alarm condition when the gap alarm condition is fulfilled.

6. The weather information service device of claim 5, wherein the controller is configured to:
determine whether the gap alarm condition is fulfilled based on a combination of at least two variables included in the gap.

7. The weather information service device of claim 6, wherein the controller is configured to determine whether the gap alarm condition is fulfilled based on a correlation between the gap and a tendency of actual weather that is analyzed using past data.

8. The weather information service device of claim 5, wherein the controller is configured to measure the gap during a period excluding a preset interval, wherein the preset interval comprises a time before the weather forecast is received and a time after the weather forecast is received.

9. A device for generating disaster information using weather information, comprising:
a message receiver configured to receive, from a terminal device, a report message, including location information and weather information to determine a disaster situation;
a weight calculator configured to:
calculate a weight by analyzing the weather information to determine urgency information of the disaster situation; and
calculate the weight by analyzing a bad weather condition including at least one of a typhoon, a windstorm, a flood, a drought, a heavy snowfall, hail, thunder, a high temperature, or a low temperature; and
a list generator configured to:
generate a disaster information list by assigning a priority to the disaster situation by applying the weight to the disaster situation and the priority to an area corresponding to the location information;
assign a higher priority to the disaster situation corresponding to a value of the weight; and
locate the disaster situation in a higher position of the disaster information list corresponding to the priority.

* * * * *